United States Patent
Reuter et al.

(10) Patent No.: US 11,654,780 B2
(45) Date of Patent: May 23, 2023

(54) VEHICLE ELECTRONIC CONTROL UNIT AND METHOD

(71) Applicant: Consolidated Metco, Inc., Vancouver, WA (US)

(72) Inventors: David Carnell Reuter, Ann Arbor, MI (US); Christopher Gregg, Vancouver, WA (US); Victor T. Oke, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 0 days.

(21) Appl. No.: 17/553,141

(22) Filed: Dec. 16, 2021

(65) Prior Publication Data

US 2022/0194233 A1 Jun. 23, 2022

Related U.S. Application Data

(60) Provisional application No. 63/126,913, filed on Dec. 17, 2020, provisional application No. 63/126,918, (Continued)

(51) Int. Cl.
*B60L 15/20* (2006.01)
*B60K 7/00* (2006.01)
(Continued)

(52) U.S. Cl.
CPC ........ *B60L 15/2009* (2013.01); *B60K 7/0007* (2013.01); *B60L 7/10* (2013.01);
(Continued)

(58) Field of Classification Search
CPC ........ B60L 15/2009; B60L 7/10; B60L 50/60; B60L 2240/12; B60L 2240/421;
(Continued)

(56) References Cited

U.S. PATENT DOCUMENTS 6,081,042 A * 6/2000 Tabata ..................... B60K 6/48
903/910
8,264,093 B2 9/2012 Moore
(Continued)

OTHER PUBLICATIONS

Park, Jim; ConMet eHub Harnesses Kinetic Energy for Electric Vehicles; article from https://www.truckinginfo.com/344183/conmet-ehub-harnesses-kinetic-energy-for-electric-vehicles; Nov. 7, 2019; 5 pages.
(Continued)

*Primary Examiner* — Mussa A Shaawat
(74) *Attorney, Agent, or Firm* — Fitch, Even, Tabin & Flannery LLP

(57) ABSTRACT

In one aspect of the present disclosure, a method is provided for operating a vehicle system comprising a motor, a battery, and a controller. The vehicle system is configured to provide at least one of regenerative braking wherein the motor operates to charge the battery and propulsion wherein the motor uses electrical power from the battery to propel the vehicle. The method includes, at the controller, determining an effective motor power at a motor speed and a motor torque. The effective motor power is determined based at least in part on a calculated motor power and an electrical power loss of the motor corresponding to the motor speed and the motor torque. The method further includes causing the motor to apply the motor torque to a wheel of the vehicle upon the effective motor power satisfying an operating condition of the vehicle system.

45 Claims, 16 Drawing Sheets

Related U.S. Application Data filed on Dec. 17, 2020, provisional application No. 63/126,904, filed on Dec. 17, 2020.

(51) Int. Cl.
*B60L 50/60* (2019.01)
*B60L 7/10* (2006.01)

(52) U.S. Cl.
CPC ...... *B60L 50/60* (2019.02); *B60K 2007/0092* (2013.01); *B60L 2240/12* (2013.01); *B60L 2240/421* (2013.01); *B60L 2240/423* (2013.01); *B60L 2240/425* (2013.01); *B60L 2240/429* (2013.01); *B60L 2240/44* (2013.01); *B60L 2240/48* (2013.01); *B60L 2240/547* (2013.01)

(58) Field of Classification Search
CPC ......... B60L 2240/423; B60L 2240/425; B60L 2240/429; B60L 2240/44; B60L 2240/48; B60L 2240/547; B60K 7/0007; B60K 2007/0092
See application file for complete search history.

(56) References Cited

U.S. PATENT DOCUMENTS

| | | | |
|---|---|---|---|
| 8,596,007 B2 | 12/2013 | Hibbs | |
| 8,664,818 B2 | 3/2014 | Calvert | |
| 8,688,345 B2 | 4/2014 | Boughtwood | |
| 8,688,346 B2 | 4/2014 | Boughtwood | |
| 8,749,192 B2 | 6/2014 | Li | |
| 8,818,588 B2 * | 8/2014 | Ambrosio | B60L 3/12 180/65.21 |
| 8,955,626 B2 * | 2/2015 | Trueman | B60L 15/2009 180/65.25 |
| 9,059,659 B2 | 6/2015 | Burke | |
| 9,065,304 B2 | 6/2015 | Boughtwood | |
| 9,150,202 B2 | 10/2015 | Kirby | |
| 9,203,341 B2 | 12/2015 | Brooking | |
| 9,325,208 B2 | 4/2016 | Jaganjac | |
| 9,358,874 B2 | 6/2016 | Fraser | |
| 9,423,463 B2 | 8/2016 | Burke | |
| 9,431,939 B2 | 8/2016 | Burke | |
| 9,434,229 B2 | 9/2016 | Hilton | |
| 9,509,246 B2 | 11/2016 | Burke | |
| 9,525,313 B2 | 12/2016 | Foulsham | |
| 9,729,092 B2 | 8/2017 | Owen | |
| 9,813,007 B2 | 11/2017 | Burke | |
| 9,914,445 B2 | 3/2018 | Lyon | |
| 9,954,407 B2 | 4/2018 | Foulsham | |
| 9,975,431 B2 | 5/2018 | Martin | |
| 9,985,490 B2 | 5/2018 | Owen | |
| 10,186,933 B2 | 1/2019 | Roberts | |
| 10,263,481 B2 | 4/2019 | Roberts | |
| 10,381,895 B2 | 8/2019 | Roberts | |
| 10,396,627 B2 | 8/2019 | Owen | |
| 10,476,334 B2 | 11/2019 | Owen | |
| 10,486,715 B2 | 11/2019 | Lucas | |
| 10,491,067 B2 | 11/2019 | Fraser | |
| 10,742,099 B2 | 8/2020 | Broadbridge | |
| 10,756,582 B2 | 8/2020 | Roberts | |
| 10,938,277 B2 | 3/2021 | Owen | |
| 10,985,680 B2 | 4/2021 | Martin | |
| 10,988,033 B2 | 4/2021 | Monkhouse | |
| 11,095,195 B2 | 8/2021 | Broadbridge | |
| 11,104,315 B2 | 8/2021 | Hilton | |
| 11,114,922 B2 | 9/2021 | Tims | |
| 11,139,703 B2 | 10/2021 | Bell | |
| 11,251,737 B2 | 2/2022 | Burke | |
| 2001/0039230 A1 * | 11/2001 | Severinsky | B60W 20/30 180/65.23 |
| 2003/0074115 A1 | 4/2003 | Yamaguchi | |
| 2006/0249319 A1 | 11/2006 | Hoare | |
| 2008/0105477 A1 * | 5/2008 | Abe | B60K 6/365 180/65.265 |
| 2008/0251302 A1 * | 10/2008 | Lynn | B60K 6/12 903/915 |
| 2009/0032321 A1 | 2/2009 | Marsh | |
| 2012/0072065 A1 * | 3/2012 | Minamikawa | B60K 6/547 903/903 |
| 2012/0091832 A1 | 4/2012 | Soderberg | |
| 2013/0252773 A1 * | 9/2013 | Suntharalingam | B60K 6/387 475/5 |
| 2013/0274975 A1 * | 10/2013 | Gregg | B60L 58/12 701/22 |
| 2014/0051545 A1 * | 2/2014 | Berry | B60K 6/48 180/65.265 |
| 2015/0288230 A1 | 10/2015 | Foulsham | |
| 2015/0307086 A1 * | 10/2015 | Ketfi-Cherif | B60W 10/08 180/65.265 |
| 2016/0105132 A1 * | 4/2016 | Kim | B60L 58/15 701/22 |
| 2017/0045133 A1 | 2/2017 | Akimoto | |
| 2017/0110933 A1 | 4/2017 | Michel | |
| 2017/0324307 A1 | 11/2017 | Roberts | |
| 2018/0072304 A1 | 3/2018 | Cyr | |
| 2018/0143648 A1 | 5/2018 | Kim | |
| 2019/0263413 A1 * | 8/2019 | Hancock | B60K 6/52 |
| 2019/0318878 A1 | 10/2019 | Owen | |
| 2020/0070679 A1 * | 3/2020 | Wang | B60W 10/26 |
| 2020/0080471 A1 | 3/2020 | Schmidt | |
| 2020/0114753 A1 | 4/2020 | Biderman | |
| 2020/0119682 A1 | 4/2020 | Burke | |
| 2020/0198470 A1 | 6/2020 | Burke | |
| 2020/0223427 A1 * | 7/2020 | Shimura | B60K 6/36 |
| 2021/0094405 A1 * | 4/2021 | Payne | B60K 6/52 |
| 2021/0094425 A1 * | 4/2021 | Payne | B60L 50/60 |
| 2021/0135527 A1 | 5/2021 | Tims | |
| 2021/0370779 A1 | 12/2021 | Ford | |
| 2022/0051855 A1 | 2/2022 | Owen | |

OTHER PUBLICATIONS

PCT Search Report and Written Opinion from International Application No. PCT/US2021/063962 dated Mar. 9, 2022; 17 pages.
Protean Electric Ltd.; Understanding the Challenges of Integrating In-Wheel Motors; brochure; Apr. 2016; 26 pages.

* cited by examiner

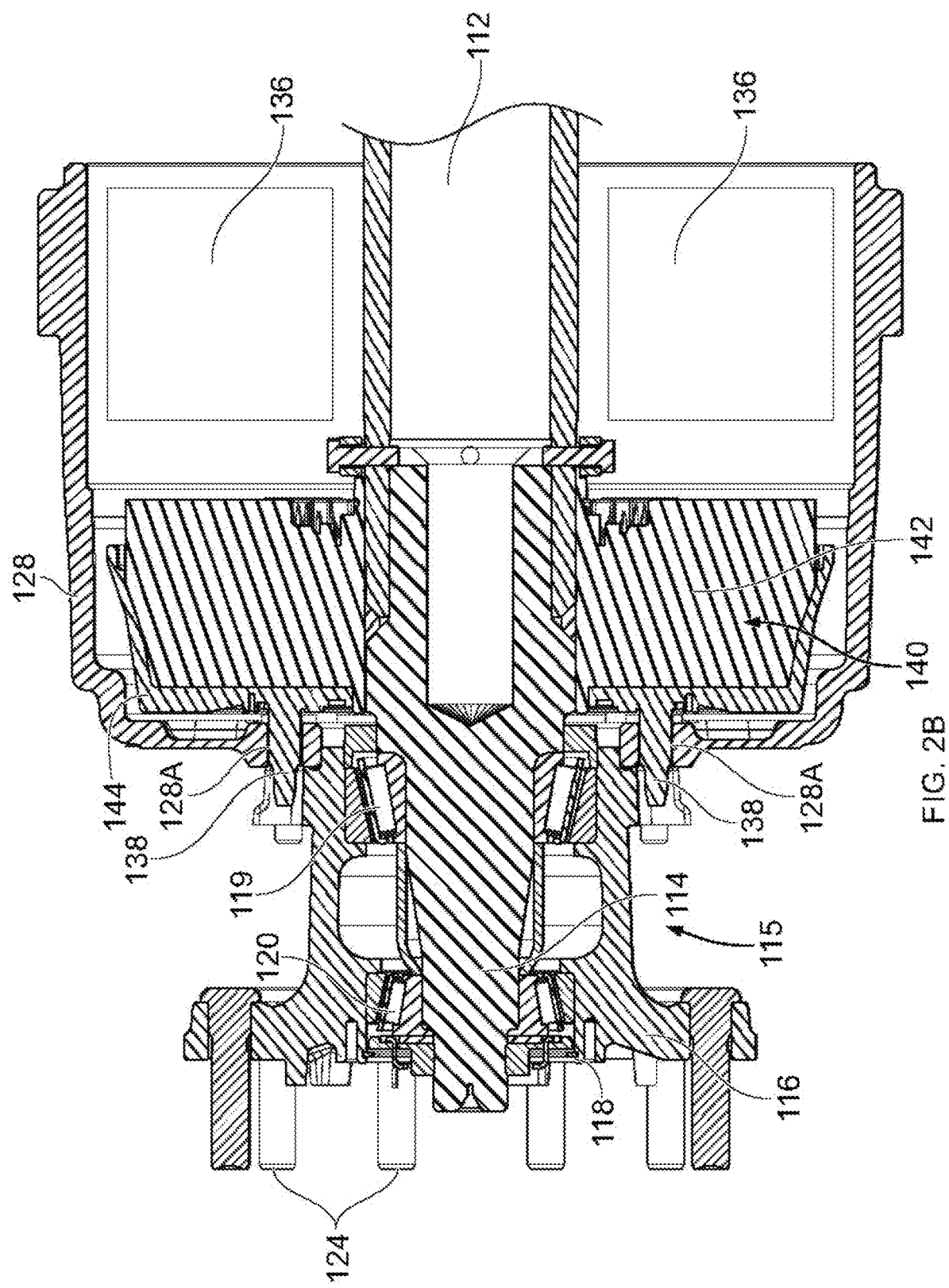

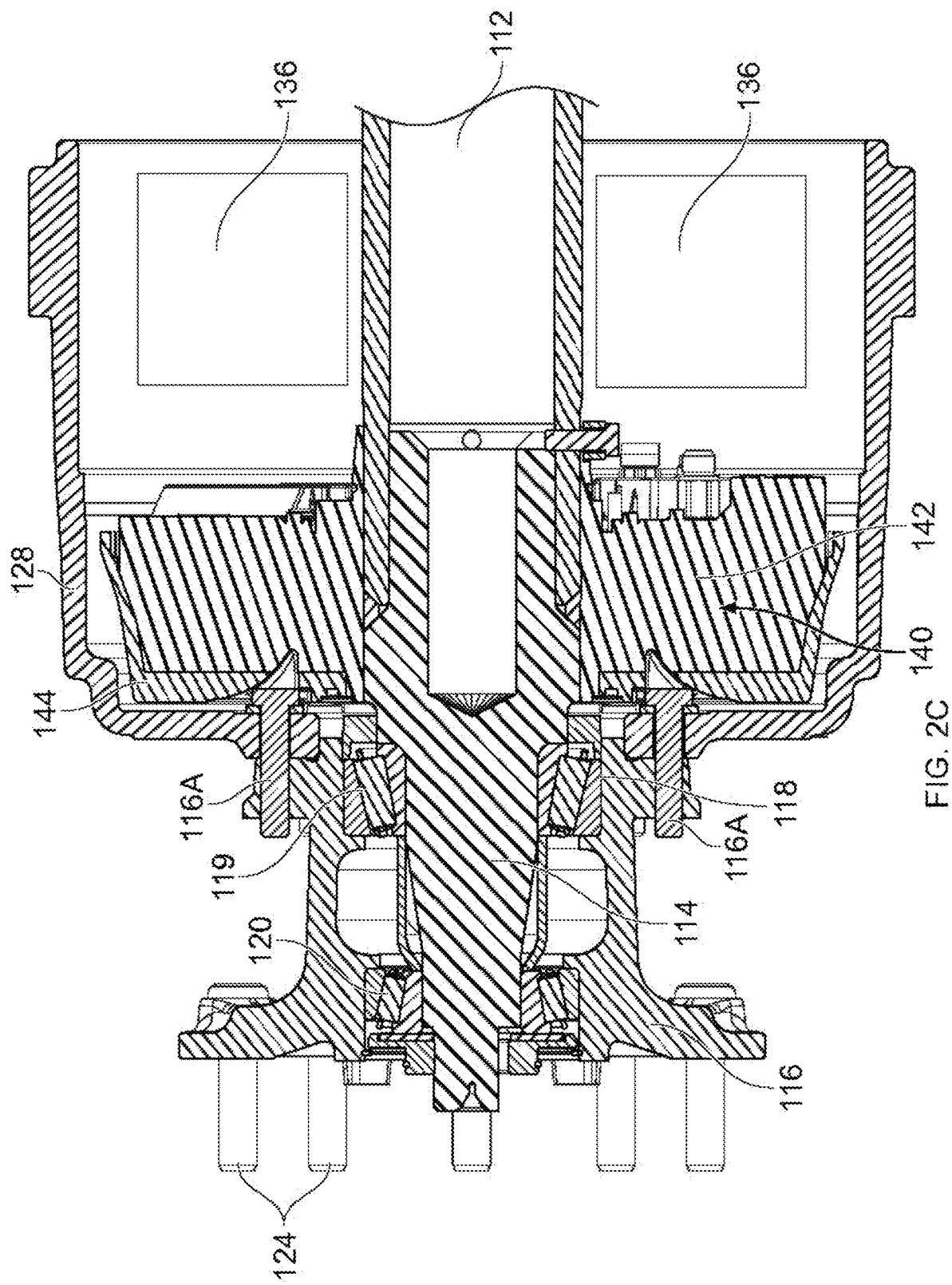

Power Consumption Table (W) 600

| Torque (N-m) | | | |
|---|---|---|---|
| | Low | Medium | High |
| Low | 100 | 200 | 300 |
| | 150 | 250 | 350 |
| Speed (RPM) Medium | 200 | 300 | 400 |
| | 250 | 350 | 450 |
| High | 300 | 400 | 500 |
| | 350 | 450 | 550 |

FIG. 6A

Regenerated Power Table (W)

| Speed (RPM) \ Torque (N-m) | High | | | | Medium | | | | Low |
|---|---|---|---|---|---|---|---|---|---|
| Low | -1131 | -941 | -782 | -653 | -540 | -443 | -361 | -292 | -232 |
| | -424 | -263 | -137 | -40 | 38 | 100 | 147 | 184 | 211 |
| | 273 | 401 | 495 | 559 | 622 | 635 | 650 | 654 | 650 |
| Medium | 959 | 1056 | 1119 | 1152 | 1166 | 1165 | 1149 | 1122 | 1086 |
| | 1640 | 1708 | 1741 | 1743 | 1727 | 1694 | 1647 | 1588 | 1521 |
| | 2318 | 2358 | 2361 | 2333 | 2286 | 2222 | 2144 | 2054 | 1956 |
| | 2994 | 3005 | 2979 | 2921 | 2844 | 2749 | 2640 | 2520 | 2390 |
| High | 3666 | 3649 | 3595 | 3507 | 3400 | 3275 | 3136 | 2984 | 2824 |

FIG. 7

VEHICLE ELECTRONIC CONTROL UNIT AND METHOD

CROSS-REFERENCE TO RELATED APPLICATIONS

This application claims the benefit of U.S. Provisional Patent Application No. 63/126,918, filed Dec. 17, 2020, U.S. Provisional Patent Application No. 63/126,904, filed Dec. 17, 2020, and U.S. Provisional Patent Application No. 63/126,913, filed Dec. 17, 2020, which are all hereby incorporated herein by reference in their entireties.

FIELD

The application relates to braking assemblies and, in particular, to braking assemblies configured to generate electrical power.

BACKGROUND

Many vehicles include regenerative braking systems that use an electric motor to aid in slowing the vehicle and to generate electricity from the rotational motion of the wheel. The generated electrical power may be used to charge a battery of the vehicle and/or power one or more components of the vehicle. To aid in slowing the vehicle, these regenerative braking systems apply torque to wheel hubs of the vehicle by way of a motor. These systems often apply a maximum available torque value when braking to maximize the braking force applied to the vehicle. Application of a maximum available torque value has generally been understood to generate high power values. Additionally, current regenerative braking systems of vehicles must work in conjunction with the mechanical friction brakes of the vehicle to slow the vehicle. For example, vehicle operators desire that transitioning between the regenerative braking and frictional braking systems is smooth and unnoticeable to the driver.

The electrical power generated by current regenerative braking may be insufficient for some applications because the torque applied by the motor is selected based on the desired rate of deceleration and to maintain a smooth transition between the regenerative braking system and the friction brakes.

BRIEF DESCRIPTION OF THE DRAWINGS

FIG. 2B is a cross-sectional view of the wheel end assembly of FIG. 2A taken along line 2B-2B of FIG. 2A.

FIG. 2C is a cross-sectional view of the wheel end assembly of FIG. 2A taken along line 2C-2C of FIG. 2A.

FIG. 6A is an example table of power consumption values for the motor of the regenerative braking system of FIG. 3 based on the motor speed and torque output.

FIG. 7 is an example table of power generation values for the motor of the regenerative braking system of FIG. 3 including a power loss region.

DETAILED DESCRIPTION

Figure 1:
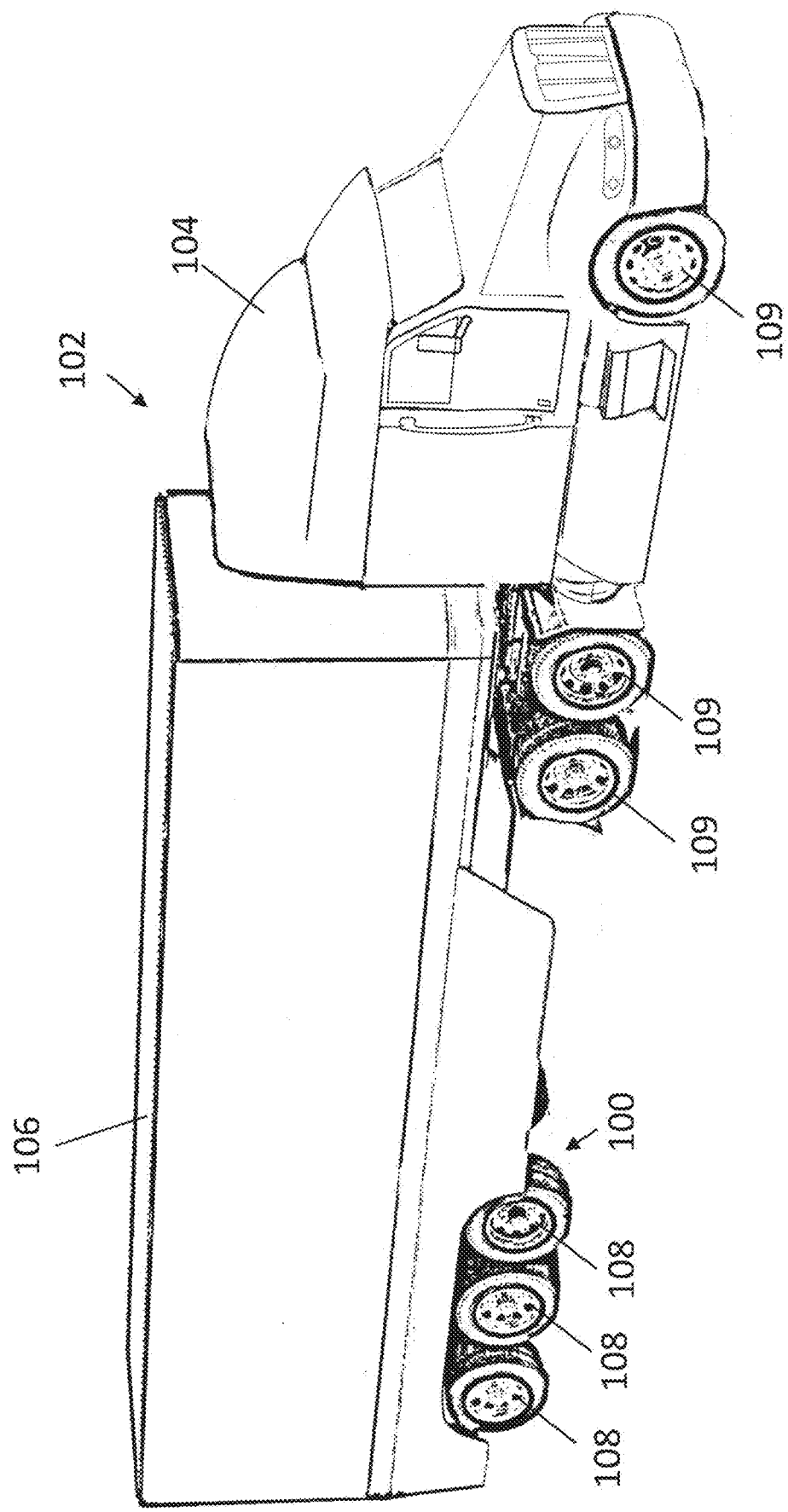
FIG. 1 is a perspective view of a vehicle including a tractor and a trailer, the trailer including a regenerative braking system.

In one aspect of the present disclosure, a method is provided for operating a vehicle system comprising a motor, a battery, and a controller. The vehicle system is configured to provide at least one of regenerative braking wherein the motor operates to charge the battery and propulsion wherein the motor uses electrical power from the battery to propel the vehicle. The method includes, at the controller, determining an effective motor power at a motor speed and a motor torque. The effective motor power is determined based at least in part on a calculated motor power and an electrical power loss of the motor corresponding to the motor speed and the motor torque. The method further includes causing the motor to apply the motor torque to a wheel of the vehicle upon the effective motor power satisfying an operating condition of the vehicle system.

For example, the vehicle system may be configured to provide regenerative braking and the operating condition comprises maximizing the effective motor power. At a lower motor speed, the electrical power loss of the motor may be relatively high when the motor applies a higher motor torque. Thus, to satisfy the operating condition of maximizing the effective motor power, the controller may utilize a motor torque that is less than the maximum torque. Utilizing a motor torque less than the maximum available torque to maximize effective motor power for regenerative braking contradicts traditional approaches of maximizing regenerative braking power which rely on using the maximum available motor torque.

The controller may have a regenerative braking mode, a vehicle propulsion mode, or both. The controller may change between the different modes in response to one or more vehicle variables. Further, the controller may utilize different operating conditions for the different modes. For example, the controller in the regenerative braking mode may utilize an operating condition that indicates maximizing the effective motor power and the controller in the vehicle propulsion mode may utilize an operating condition that indicates minimizing the effective motor power.

In one embodiment of the method, determining the effective motor power comprises determining the calculated motor power based at least in part upon the motor speed and the motor torque. Determining the effective motor power further includes determining the electrical power loss based at least in part upon a data structure including information representative of electrical power loos of the motor at a plurality of motor speeds and a plurality of motor torques. For example, the data structure may include a plurality of tables of electrical power loss of the motor for varying motor speeds, motor torques, and battery bus voltages.

In one embodiment of the method, determining the effective motor power at the motor speed and motor torque comprises determining a first effective motor power at the motor speed and a first motor torque. Determining the effective motor power comprises determining a second effective motor power at the motor speed and a second motor torque. The method includes causing the motor to apply the first torque to the wheel if the first effective motor power satisfies the operating condition or applying the second torque to the wheel upon the second effective motor power satisfying the operating condition.

The present disclosure also provides an electronic control unit for a vehicle system. The electronic control unit includes communication circuitry configured to communicate with a battery and a motor of the vehicle. The electronic control unit further includes a processor operatively connected to the communication circuitry. The processor is configured to determine an effective motor power at a motor speed and a motor torque based at least in part on a calculated motor power and an electrical power loss of the motor corresponding to the motor speed and the motor torque. The processor is further configured to cause the motor to apply the motor torque to a wheel of the vehicle upon the effective motor power satisfying a vehicle operating condition. In this manner, the processor may cause the motor to apply a motor torque to the wheel if the effective motor power, which takes into account the electrical power loss of the motor, if the effective motor power associated with the motor torque satisfies the vehicle operating condition.

In another aspect of the present disclosure, a wheel end system for a vehicle is provided. The wheel end system includes a wheel hub configured to rotatably mount to a spindle of a vehicle, a motor, a battery, and a controller. The motor has a stator configured to be fixed relative to the spindle and a rotor configured to be secured to the wheel hub. The controller is configured to determine an effective motor power at a motor speed and a motor torque based at least in part on a calculated motor power and an electrical power loss of the motor corresponding to the motor speed and the motor torque. The controller is further configured to cause the motor to apply the motor torque to the wheel hub via the rotor upon the effective motor power satisfying a vehicle operating condition. In one embodiment, the vehicle is a refrigerated trailer and the wheel end system comprises a wheel hub and a motor for each of a plurality of wheels. The controller is operatively connected to the plurality of motors and independently coordinates operation of the motors to provide regenerative braking or vehicle propulsion as appropriate.

In another aspect of the present disclosure, a regenerative braking system is provided for a vehicle that controls the torque applied by a motor of the regenerative braking system to a wheel hub of the vehicle based at least in part on one or more variables, such as factors or conditions, unrelated to braking of the vehicle. In one embodiment, the system may adjust the torque applied based on one or more variables of the regenerative braking system and/or the vehicle. For instance, the regenerative braking system may adjust the torque applied by the motor based in part on the charge level of a battery that the regenerative braking system charges. Where the current amount of power generated by the regenerative braking system is not desired (e.g., the battery is almost fully charged and cannot handle the amount of power generated), the system may adjust (e.g., decrease) the torque applied by the motor to the wheel hub to adjust the amount of power generated by the regenerative braking system irrespective of a desired rate of deceleration of the vehicle requested by a user pressing a brake pedal of the vehicle.

The systems disclosed herein may be utilized in various vehicles including passenger vehicles such as a car, a SUV, or a truck. The regenerative braking systems may also be used in commercial vehicles such as a tractor, a trailer, a tractor-trailer, a box truck, and a bus as examples. The systems disclosed herein may utilize one or more motors that apply torque to one or more wheels. The motors may apply the torque directly to the wheels such as in embodiments where the motors have rotors secured to wheel hubs to which the wheels are mounted. Alternatively or in addition, one or more motors may apply the torque indirectly to the wheels such as by applying torque to an axle of the vehicle. The regenerative braking system may be used in conjunction with wheels that are non-driven or wheels that are driven by a vehicle drivetrain or an electric motor. Further examples of vehicles for the regenerative braking system include mobile railway assets such as locomotives and rail cars.

With reference to FIG. 1, a semi-truck 102 is shown having a regenerative braking system 100, a tractor 104, and a trailer 106. While the following discussion describes an example application where the regenerative braking system 100 is coupled to a wheel 108 of the trailer 106, those having skill in the art will readily appreciate that the disclosed regenerative braking system 100 may be utilized with any one or more of the wheels 109 of the tractor 104 or the wheels 108 of the trailer 106 of the semi-truck 102. Regarding FIGS. 1 and 2B, in one embodiment, the regenerative braking system 100 includes a motor 140 coupled to a wheel hub 116 of each wheel 108 of the trailer 106. Each motor 140 may be independently controlled to apply a braking force to the trailer 106 to slow the trailer 106 and/or to apply a propelling force to the trailer 106 and assist the semi-truck 102 in moving the trailer 106.

Figure 2A:
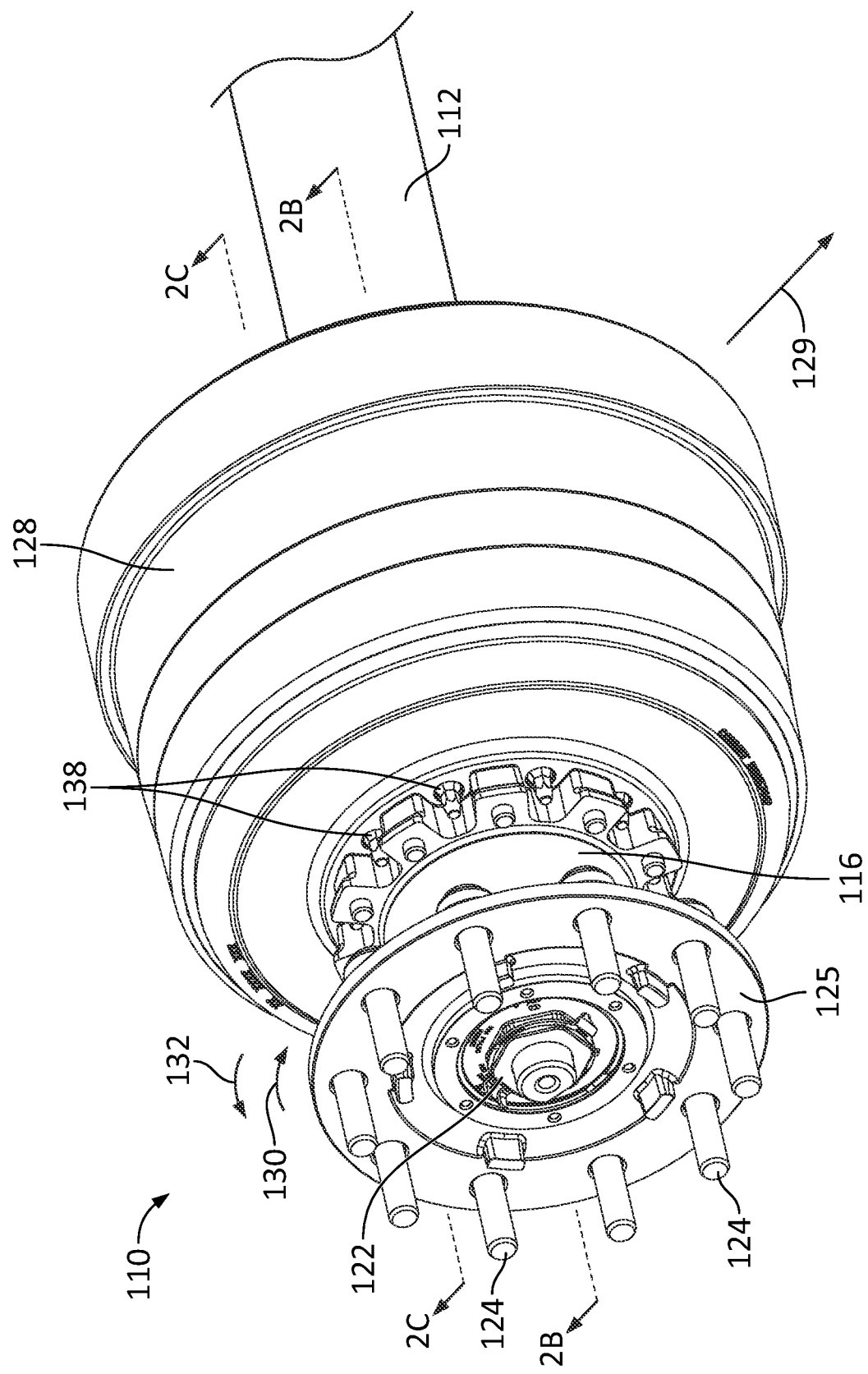
FIG. 2A is a perspective view a wheel end assembly including a regenerative braking motor.

With reference to FIGS. 2A-2C, a wheel end assembly 110 of the trailer 106 is shown including at least a portion of the regenerative braking system 100. The wheel end assembly 110 includes an axle 112 to which a spindle 114 is coupled and a wheel hub assembly 115 rotatably mounted to the spindle 114. The wheel hub assembly 115 includes a wheel hub 116 having a wheel hub central opening 118 through which the spindle 114 extends. The wheel hub assembly 115 includes an inboard bearing 119 and an outboard bearing 120 in the central opening 118 and on which the wheel hub 116 rotates about the spindle 114. A spindle nut assembly 122, such as a spindle nut and washer, is connected to an end of the spindle 114 to retain the wheel hub 116 on the spindle 114. The wheel hub 116 includes a flange 125 and a plurality of threaded wheel studs 124 onto which a wheel 108 may be mounted.

As shown in FIGS. 2B-C, at least a portion of the regenerative braking system 100 may be contained within a brake drum 128 coupled to and rotatable with the wheel hub 116. The motor 140 of the regenerative braking system 100 is protected by the brake drum 128 that is coupled to the wheel hub 116 via fasteners 116A, such as bolts. The motor 140 includes a stator 142 rotationally fixed relative to the axle 112 and/or spindle 114 and a rotor 144 configured to rotate about the stator 142. The rotor 144 includes a plurality of studs 138 extending parallel to the axis of the axle 112. The plurality of studs 138 extend through corresponding holes 128A in the brake drum 128. Because the wheel hub 116 is coupled to the brake drum 128 and the plurality of studs 138 extend through holes 128A of the brake drum 128, rotation of the wheel hub 116 about the spindle 114 causes rotation of the rotor 144 about the stator 142. Thus, rotation of the wheel hub 116, caused by movement of the semi-truck 102, may be used to generate electric power via operation of the motor 140 as a generator. With reference to FIG. 2A, a wheel hub 116 is shown on the passenger-side of the vehicle. When the vehicle is moving in a forward direction 129, the passenger-side wheel hub 116 of the vehicle may rotate about the spindle 114 in a clockwise direction 130. To generate electrical power, the motor 140 converts the kinetic energy of the rotating rotor 144 into electrical energy and, in doing so, a torque to the wheel hub 116 in a direction 132 opposite the direction of rotation of the wheel. Applying torque in the direction 132 opposite the direction of rotation of the wheel hub 116 slows the speed of rotation of the wheel hub 116, thus providing a braking force to the vehicle. For driver-side wheel hubs 116, movement in the forward direction 129 results in the wheel hub 116 rotating in a counter-clockwise direction about the spindle 114 when viewed from the driver's side. The torque applied in generating electric power is applied in the clockwise direction about the spindle 114.

In some embodiments, the motor 140 used to generate electrical power may also be used to drive the vehicle such as in a hybrid or electric vehicle. For example, the motors 140 of the regenerative braking system 100 may be coupled to the wheels 109 of the tractor 104 and/or the wheels 108 of the trailer 106. The motor 140 may be used to drive the vehicle or to assist in moving the vehicle. Where the motor 140 is coupled to the wheel 108 of a trailer, the motor 140 may provide torque to the wheel hub 116 to assist the tractor 104 in moving the trailer 106. For instance, the motor 140 may provide a torque to the wheel hub 116 to produce movement of the trailer 106 in the desired direction of travel of the trailer 106, thereby reducing the amount of power required by the tractor 104 to move the trailer 106.

To apply the torque to the wheel hub 116, a control signal is applied to the motor 140 causing the stator 142 to drive the rotor 144 about the stator 142 in the desired direction of travel. Since the rotor 144 is coupled to the wheel hub 116 via the brake drum 128 as described above, torque applied to the rotor 144 causes torque to be applied to the wheel hub 116. A control signal may be supplied to each motor 140 of the vehicle to coordinate providing the torque assist in the direction of movement of the vehicle. For example, each motor 140 may be supplied with a control signal including information regarding torque and direction to operate the respective motors 140. To aid in moving the vehicle in a forward direction, the motor 140 may apply a torque to the wheel hub 116 in the forward direction 130 shown in FIG. 2A. To aid in moving the vehicle in a reverse direction, the motor controller 146 may apply a torque to the wheel hub 116 in the reverse direction 132 shown in FIG. 2A to cause the wheel hub 116 to rotate in the reverse direction. Where the motors 140 are coupled to the wheels 108 of a trailer, the torque assist provided by the motor 140 may not be high enough to move the tailer 106 on its own, but instead acts to reduce the load of the trailer 106 on the tractor 104.

In other embodiments, the motor 140 is not coupled to the wheel hub 116 via the brake drum 128. The motor 140 may be indirectly coupled to the wheel hub 116 such that rotation of the wheel hub 116 caused by the movement of the vehicle turns the rotor 144 of the motor 140. For example, the rotor 144 of the motor 140 may be coupled to an axle of the vehicle that is coupled to the wheel hub 116 such that the axle turns with rotation of the wheel hub 116. In another form, the motor 140 is coupled to the driveshaft of the vehicle such that rotation of the driveshaft causes the rotor 144 of the motor 140 to rotate and vice versa. In these examples where the wheel hub 116 is indirectly coupled to the motor 140, torque applied by the motor 140 to brake or drive the rotor 144 results in the torque being applied to the wheel hub 116.

With reference to the embodiment shown in FIGS. 2A-C, the wheel assembly 110 further includes friction brakes including a brake shoe 136 within the brake drum 128 that is operable to slow rotation of the wheel hub 116 and stop the vehicle in conjunction with the regenerative braking system 100. The brake shoe 136 includes a friction material that is configured to be brought into engagement with the brake drum 128 (e.g., the radially inner surface thereof) when a braking force is desired. When the brake shoe 136 engages the brake drum 128, a frictional force counteracting the rotation of the wheel hub 116 is created that slows the rotation of the wheel hub 116 and thus slows or stops the vehicle. In another embodiment, the vehicle includes a disc brake rather than a drum brake. In this embodiment, the disc brakes include a brake disc that is coupled to the wheel hub 116 such that rotation of the wheel hub 116 causes rotation of the brake disc. The vehicle further includes a brake caliper that is coupled to the vehicle (e.g., the axle 112) and is configured to engage the brake disc, for example, by clamping the brake disc. Causing the brake caliper to engage the brake disc creates a frictional force that counteracts the rotation of the brake disc and thus the wheel hub 116 thereby slowing the vehicle. In some embodiments, the friction brakes of a vehicle are primarily used to slow and stop the vehicle. The regenerative braking system 100 may provide significantly less braking force, e.g., an order of magnitude less, than the friction brakes of the vehicle. Using a regenerative braking system 100 configured to provide significantly less braking force to the vehicle than the friction brakes enables the regenerative braking system 100 to operate without respect to the operation of the friction brakes of the vehicle. For instance, the regenerative braking system 100 may operate even when the friction brakes are not engaged.

Figure 3:
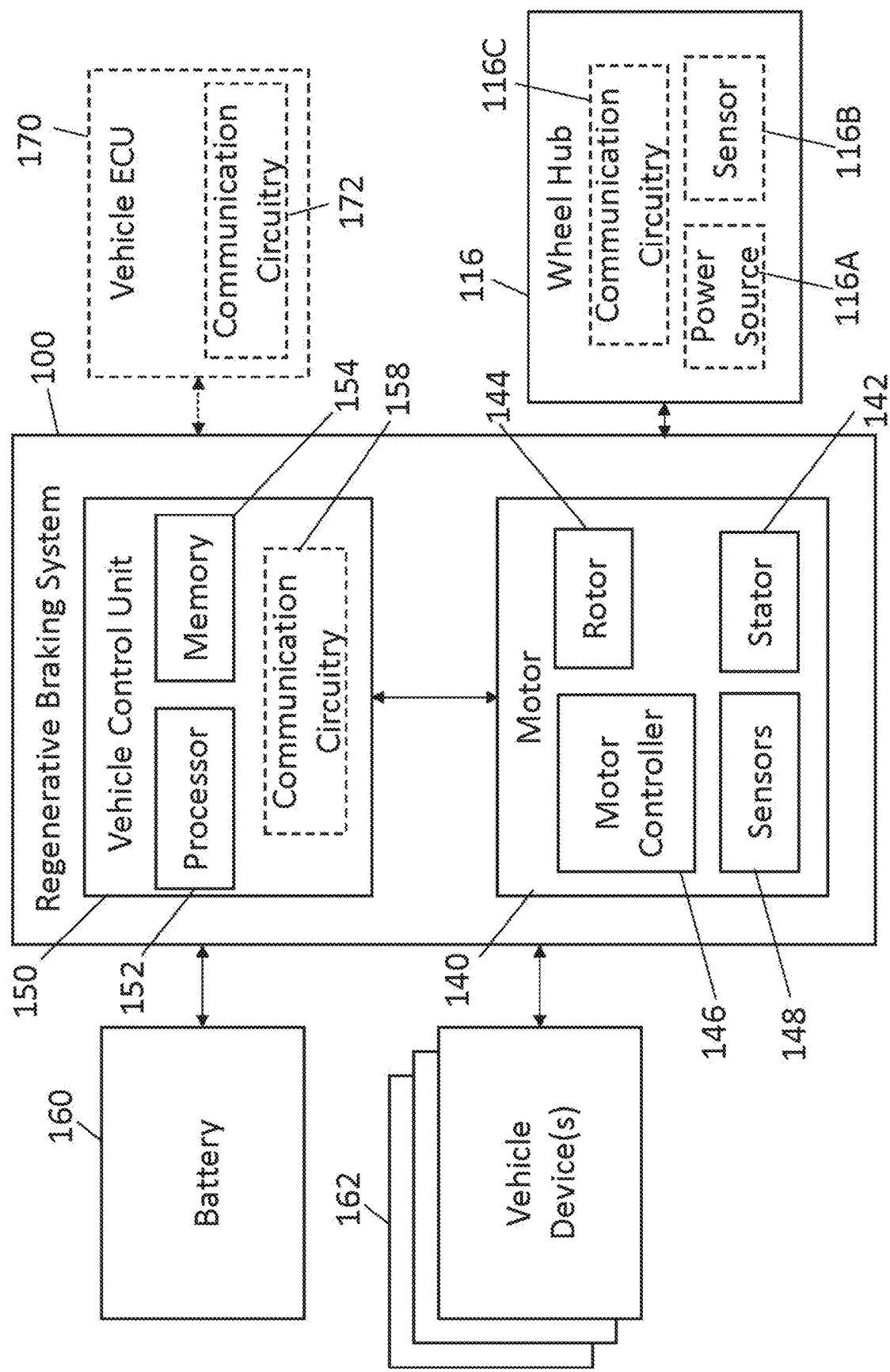
FIG. 3 is a schematic diagram of the regenerative braking system of FIG. 1 in communication with other components of the vehicle.

With reference to FIG. 3, the regenerative braking system 100 includes the motor 140 and a controller or electronic control unit such as a vehicle control unit 150. The vehicle control unit 150 unit has at least one of regenerative braking mode and a vehicle propulsion mode. In the regenerative braking mode or the vehicle propulsion mode, the vehicle control unit 150 operates the components of the vehicle to provide the associated functionality. More specifically, The motor 140 includes the stator 142, the rotor 144, a motor controller 146, and one or more sensors 148. The motor controller 146 may include a memory and processor configured to control the operation of the motor 140. The motor controller 146 is configured to receive a torque request or a command to apply a torque to the wheel hub 116. The motor controller 146 is configured to execute the torque command that the motor controller 146 receives, causing the motor 140 to apply a torque to the wheel hub 116 to apply a braking or driving force to the vehicle. Where a braking force is applied, the motor 140 generates electrical power that may be used to charge a battery 160 or to run an electrically powered device of the vehicle. To apply a braking force, the motor controller 146 may apply and control the current in the stator 142 of the motor 140 to electrically interact with the rotor and apply a torque to the wheel hub 116 via the rotor 144 in the direction opposite the direction of rotation of the wheel hub 116. To apply a driving force, the motor controller 146 similarly applies and controls the current in the stator 142 to apply a torque to the wheel hub 116 via the rotor 144 in the desired direction of rotation of the wheel hub 116. The motor controller 146 induces a magnetic field with the stator 142 by controlling the current in the stator 142. As discussed below, during regenerative braking, the motor voltage is proportional to the speed of the motor and the torque of the motor is proportional to the current.

The sensors 148 of the motor 140 may be used to monitor aspects of the operation and health of the motor 140. The sensors 148 may be communicatively coupled to the motor controller 146 which may process the sensor data. The sensors 148 may include, for example, a speed sensor that monitors the rotational speed of the rotor 144 about the stator 142. The sensors 148 may also include a temperature sensor that monitors the temperature of the motor 140. For instance, the temperature sensor may monitor the temperature of the stator 142 of the motor 140. The temperature sensor may be a thermistor or thermocouple as examples.

As another example, the sensors 148 may include one or more sensors used to provide data used to estimate the torque the motor 140 is applying to the wheel hub 116. In general terms, the motor torque ($\tau$) can be calculated with motor DC current (IDC), DC battery bus voltage (Vbatt), average Motor Efficiency ($\eta$) and Motor Angular Speed ($\omega$) according to the following formula:

$$\tau = (IDC * Vbatt * \eta)/\omega$$

The motor DC current (IDC) is the current supplied to the stator 142 of the motor 140. The average Motor Efficiency ($\eta$) is an inherent and measured characteristic of the motor 140 and an associated motor inverter (drive) together. The average Motor Efficiency includes both the motor 140 and the associated inverter because doing so accounts for the efficiency of the conversion of DC power to AC power to drive the motor 140 and the efficiency of the motor 140 itself. In one embodiment, the sensors 148 include a current sensor configured to monitor the current of the stator 142 of the motor 140, a voltage probe configured to monitor the voltage of the battery 160 or bus thereof, a speed sensor configured to measure the angular speed of the motor 140, and a temperature sensor that monitors the temperature of the motor 140. The sensors 148 may be used to determine whether there is a problem with the motor 140 or whether the motor controller 146 needs to make adjustments to operation of the motor 140. For instance, where the motor controller 146 sets the torque applied by the motor 140 to the wheel hub 116, the motor controller 146 may use the torque data received from sensors 148 to adjust the control signals applied to the motor 140 in the event the actual torque applied by the motor 140 to the wheel hub 116 is different than the torque the controller 146 requested be applied.

The motor 140 may be electrically coupled to the battery 160 of the vehicle, for example, via a battery bus. When applying a braking force, as the motor 140 generates electricity, current may flow from the motor 140 to the battery 160 to charge the battery 160. The battery 160 may be a battery of the vehicle that powers one or more onboard vehicle devices 162. In one embodiment, the vehicle devices 162 may include an electrically powered refrigeration system to keep the contents in an enclosed space of the vehicle cool. For example, the refrigeration system may cool an interior of the trailer 106 and the contents within the trailer 106. As another example, the refrigeration system may be configured to cool a box of a box truck. The refrigeration system may be electrically coupled to the battery 160 such that the refrigeration system draws power from the battery 160 to operate. Other examples of vehicle devices 162 of the trailer 106 that may be similarly powered by the battery 160 include a communications system, a global navigation satellite system receiver, powered liftgate, pallet truck charger, hydraulic equipment, and/or devices on-board the tractor 104. In some forms, the battery 160 may supply power to the motors 140 to provide a traction or driving torque to the wheel hub 116 via the motors 140 to assist in moving the vehicle. The battery 160 may be charged by the motor 140 when the vehicle is in motion so that when the vehicle is at rest, the vehicle device(s) 162 may continue to operate. For example, once the vehicle is parked, the refrigeration system of the trailer 106 may continue to run using the battery 160 to keep the contents of the trailer 106 cool.

Alternatively or additionally, the motor 140 may be electrically coupled to the one or more vehicle device 162 of the vehicle such that the motor 140 provides electrical power directly to the vehicle device 162. For example, if the motor 140 is generating electricity, the refrigeration system of the trailer 106 may draw electrical power directly from the motor 140 rather than depleting the power stored in the battery 160. The electrical system of the semitruck 102 and/or individual vehicle device(s) 162 (e.g., the refrigeration system) may include power conditioning circuitry to provide the requisite power to vehicle device(s) 162 from the power received from the motor 140.

In another embodiment, the vehicle includes multiple batteries 160 having differing voltage ranges. For example, the vehicle may include a low voltage battery 160 for powering low voltage vehicle devices 162 of the vehicle and a high voltage battery 160 for powering high voltage vehicle devices 162 of the vehicle. The vehicle may include power conditioning circuitry to condition the electric power generated by the motor 140 to charge the batteries 160 of different voltages properly.

The motor controller 146 is in communication with an electronic vehicle control unit, such as a vehicle control unit 150, of the regenerative braking system 100. The motor controller 146 may receive control signals from the vehicle control unit 150 and may send motor operation and health information collected via the sensors 148 to the vehicle control unit 150. The motor controller 146 and the vehicle control unit 150 may communicate via a communication bus, for example, a CAN bus. The vehicle control unit 150 may include a processor 152 and memory 154 and may be a computer associated with the vehicle (e.g., the trailer 106). The vehicle control unit 150 may also include communication circuitry 158 for communicating with other devices, such as the motor controller 146, via wired and/or wireless connections. As examples, the communication circuitry 158 may be configured to communicate using one or more of wireless fidelity (Wi-Fi), cellular, radio frequency (RF), infrared (IR), Bluetooth (BT), Bluetooth Low Energy (BLE), Zigbee and near field communication (NFC). In some embodiments, the communication circuitry 158 is configured to communicate with a remote computer via wide area wireless network and the internet. The vehicle control unit 150 may be configured to communicate with a portable electronic device such as a laptop computer, smartphone, tablet computer, or the like. In some forms, the vehicle control unit 105 may be configured to communicate information with the portable electronic device regarding the status of the vehicle and/or the regenerative braking system 100. For instance, the vehicle control unit 150 may communicate the charge level of the battery 160 of the trailer 106 to the smartphone of the vehicle operator during a pre-trip check of the semitruck 102. In one form, the vehicle control unit 150 may communicate status information to a remote server computer associated with a smartphone application installed on the vehicle operator's smartphone. The remote server computer may communicate status information provided by the vehicle control unit 150 to the vehicle operator's smartphone for review by the vehicle operator and/or to a computer of a fleet manager. For example, the status information may be viewable on a website, within an application, and/or may be presented to the vehicle operator via a notification pushed to the vehicle operator's smartphone.

The vehicle control unit 150 may act as a central controller to control the operation of the one or more motors 140 of the vehicle. The vehicle control unit 150 may control each motor 140 of the regenerative braking system 100 independently to apply a braking force to the vehicle and generate electrical power which may be used to charge the battery 160 and/or power the vehicle devices 162. To generate electrical power via the one or more motors 140 of the regenerative braking system 100, the vehicle control unit 150 sends a control signal including a desired torque to the motor controller 146. The motor controller 146, upon receiving the control signal and torque value from the vehicle control unit 150, controls the voltage and/or current of the stator 142 to cause the motor 140 to generate electrical energy and apply the torque to the wheel hub 116. The vehicle control unit 150 may determine the torque the motor 140 applies based on the desired braking force to apply to the vehicle and/or to generate a desired amount of electrical power. The vehicle control unit 150 may determine the amount of electrical power that will be generated by the motor 140 using the following equation:

$$\text{Regenerated Power} = \text{Torque Applied} * \text{Motor Speed} - \text{Motor Electrical Power Loss}$$

The vehicle control unit 150 may use this equation to calculate how much power will be regenerated by the motor 140 based on the applied torque value and current speed of the motor 140.

Similarly, the vehicle control unit 150 may control each motor 140 to apply a driving force or traction assist torque to the vehicle. The vehicle control unit 150 controls when and the amount of torque applied by the motor 140 to apply the desired driving force to the vehicle. The vehicle control unit 150 sends a control signal including a desired torque to the motor controller 146. The motor controller 146, upon receiving the control signal and torque value from the vehicle control unit 150, controls the voltage and/or current of the stator 142 to cause the motor 140 to apply the torque to the wheel hub 116. The vehicle control unit 150 may determine the torque the motor 140 applies based on the desired driving torque to apply to the vehicle and/or the amount of power that will be consumed. The vehicle control unit 150 may determine the amount of electrical power that will be used by the motor 140 to apply the torque using the following equation:

$$\text{Power Consumption} = \text{Torque Applied} * \text{Motor Speed} + \text{Motor Electrical Power Loss}$$

The vehicle control unit 150 is in communication with the battery 160 of the vehicle. The vehicle control unit 150 may be configured to receive the charge level (e.g., a voltage level and/or remaining amp-hours) of the battery 160. The vehicle control unit 150 may also receive other operational and health-related information from the battery 160 such as, for example, the temperature of the battery 160, the battery cell voltages (e.g., minimum, maximum, and/or average), the current flowing to or from the battery, the pack state of charge and state of health, the pack voltage, the contactor status, and/or the charge/discharge limits. The vehicle control unit 150 may determine, based on the operation and health related information, the amount of power the battery 160 is able to accept for recharging or output for driving the trailer 106. Additionally or alternatively, the battery 160 may determine the amount of power the battery 160 is able to accept to charge or output and report this data to the vehicle control unit 150. The battery 160 may also report an error signal to the vehicle control unit 150 when there is something wrong with the battery 160. For instance, when the battery 160 exceeds a predetermined temperature, the battery 160 may send a signal to the vehicle control unit 150 indicating that the battery 160 is not currently able to be charged or used to supply power. The battery 160 may also communicate its temperature to the vehicle control unit 150 and the vehicle control unit 150 may control the amount of power generated by the regenerative braking system 100 so that the battery 160 does not exceed a threshold temperature. Likewise, based on the temperature of the battery 160, the vehicle control unit 150 may control the amount of power the battery 160 is able to output to the motor 140 to provide a torque assist so that the battery 160 does not overheat. The vehicle control unit 150 may communicate an error to the vehicle operator via a human machine interface, e.g. a display of the vehicle or to a remote computer (e.g., a server computer associated with the vehicle) via the communication circuitry 158.

In some embodiments, the vehicle control unit 150 is in communication with a vehicle electronic control unit ("vehicle ECU") 170. The vehicle ECU 170 may be a computer that facilitates the operation of the vehicle. For instance, the vehicle ECU 170 may be a computer of the tractor 104 of the semi-truck. In some embodiments, the vehicle ECU 170 and the vehicle control unit 150 may be the same device. The vehicle ECU 170 may include communication circuitry 172 for communicating with devices, such as the vehicle control unit 150, via wired and/or wireless connections. As examples, the communication circuitry 158 may be configured to communicate using one or more of wireless fidelity (Wi-Fi), Cellular, radio frequency (RF), infrared (IR), Bluetooth (BT), Bluetooth Low Energy (BLE), Zigbee and near field communication (NFC). The vehicle ECU 170 may communicate driving-related information of the vehicle to the vehicle control unit 150, for example, via a CAN bus of the vehicle. As examples, the vehicle ECU 170 may communicate which gear the vehicle is in (e.g., reverse, forward, park), the speed of the vehicle, whether the parking brake is on, whether the cruise control is active, whether the anti-lock brake system (ABS) is active, the degree to which the accelerator pedal is depressed (e.g., not depressed, 10% depressed, 25% depressed, 100% depressed), and the time since the vehicle was started. Other vehicle or driving related information may also be communicated to the vehicle control unit 150.

As described above, the motor 140 is coupled to the wheel hub 116 and applies a torque to the wheel hub 116 that resists rotation of the wheel hub 116 or assists in rotation of the wheel hub 116. In some embodiments, the wheel hub 116 may include a power source 116A, a sensor 116B, and communication circuitry 116C. The power source 116A may include a battery. Alternatively or additionally, the power source 116A may include a coil of wire configured to interact with a magnet of the vehicle spindle to produce power on the wheel hub 116. The power source 116A may be used to power a sensor 116B that may monitor a temperature of the wheel hub 116, a speed or acceleration of the wheel hub 116, or other aspects of the wheel hub 116. As one example, the sensor 116B may be a strain gauge that monitors the strain placed on the wheel hub 116. The communication circuitry 116C of the wheel hub 116 may communicate the data produced by the sensor 116B via a wireless protocol such as wireless fidelity (Wi-Fi), cellular, radio frequency (RF), infrared (IR), Bluetooth (BT), Bluetooth Low Energy (BLE), Zigbee and near field communication (NFC) to a remote device, such as a remote server computer, of the vehicle control unit 150, and/or the vehicle ECU 170.

Figure 4:
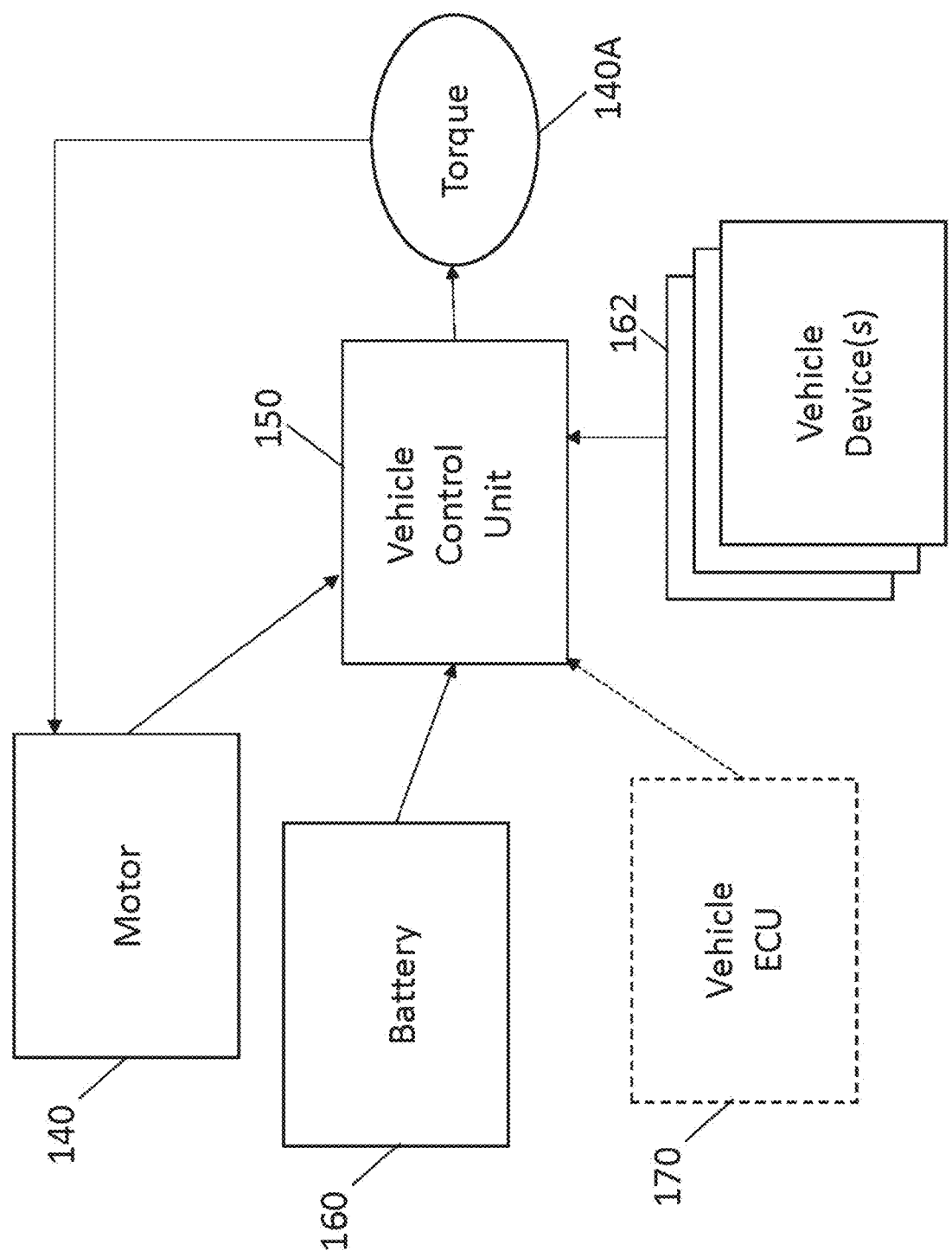
FIG. 4 is a flow diagram of a vehicle control unit of the regenerative braking system of FIG. 3 controlling a motor of the regenerative braking system based on one or more variables of the vehicle.

With reference to FIG. 4, the vehicle control unit 150 determines the torque 140A that the motor 140 applies to the wheel hub 116 to generate electrical power or provide a driving torque assist. The vehicle control unit 150 may determine the amount of torque for the motor 140 to apply to the wheel hub 116 based on one or more inputs or vehicle variables received from components of the vehicle. As shown in FIG. 4, the vehicle control unit 150 may receive information from the motor 140, the battery 160, and/or the vehicle ECU 170. Based on the information received from these sources, the vehicle control unit 116 may determine a torque value and communicate the torque value to the motor controller 146 to cause the motor 140 to apply torque of the amount determined by the vehicle control unit 150 to the wheel hub 116.

The vehicle control unit 150 may receive and monitor battery variables such as the battery charge level and/or battery temperature. The vehicle control unit 150 may monitor the charge level of the battery 160 when determining the torque to apply to the wheel hub 116 via the motor 140. If the charge level of the battery 160 is low, for example, less than 90% charged, the vehicle control unit 150 may select the highest torque value the motor 140 is capable of applying to generate electrical power. Where the charge level of the battery 160 is 100% charged, the vehicle control unit 150 determines to stop applying torque to the wheel hub 116 via the motor 140 and thus causes the regenerative braking system 100 to generate no electrical power. In some forms, even when the battery 160 is fully charged, the vehicle control unit 150 may monitor an accessory load variable that indicates the power consumption of the vehicle device(s) 162 of the vehicle. If the accessory load variable indicates the vehicle device(s) 160 are running and/or consuming power, the vehicle control unit 150 may cause the motor 140 to apply a torque to the wheel hub 116 to generate power to meet the power consumption of the vehicle device (s) 162 so the battery 160 remains fully charged.

Where the charge level of the battery 160 is approaching full (e.g., 90-99% charged), the vehicle control unit 150 may reduce the torque applied to the wheel hub 116 to reduce the amount of power generated by the motor 140. This allows the battery 160 to more slowly be charged as the battery 160 approaches a full charge level. This helps to avoid overheating of the battery 160 or not being able to store the power generated by the regenerative braking system 100 as the power is generated. The vehicle control unit 150 may also monitor the accessory load variable and the charge level of the battery 160 to determine the amount of power to generate via the motor 140. For instance, the vehicle control unit 150 may cause the motor 140 to generate an amount of power to supply power to the vehicle devices 160 indicated by the accessory load variable and, if the motor 140 is capable of generating additional power beyond the load of the vehicle devices 160, an amount of power the battery 160 is capable of handling to continue to charge the battery 160.

In applications where the motor 140 is also used to provide a drive torque to assist in moving the vehicle, the vehicle control unit 150 may be configured to determine whether to provide a torque assist based in part on the charge level of the battery 160. The vehicle control unit 150 may be configured to not apply any drive torque assist to the wheel hub 116 via the motor 140 when the battery charge level is low, for example, below a predetermined threshold. This may be done to ensure that the battery 160 has enough charge to power the vehicle devices 162 of the vehicle for a certain period of time after the vehicle has stopped and/or the regenerative braking system 100 is no longer able to recharge the battery 160. The vehicle control unit 150 may be configured to provide a torque assist where needed if the battery charge level is above a certain threshold (e.g., about 75%). For instance, if the battery 160 is fully charged and the vehicle control unit 150 determines the vehicle is accelerating, the vehicle control unit 150 may send a control signal to cause the motors 140 of the vehicle to provide a torque in the direction of movement of the vehicle to assist in accelerating. The torque assist may act to reduce the drag of the trailer 106 on the tractor 104.

The vehicle control unit 150 may also monitor the temperature of the battery 160. If the temperature of the battery 160 is above a threshold value, the vehicle control unit 150 may reduce the torque value applied by the motor 140 to reduce the power generated by the motor 140 to allow the battery 160 to cool as the battery 160 continues to charge. Alternatively or additionally, the vehicle control unit 150 may stop generating electrical power by the motor 140 if the temperature of the battery 160 is above a threshold value to allow the battery 160 to cool off before continuing to charge again. In applications where a torque assist may be provided by the motor 140, the vehicle control unit 150 may determine to not apply a torque assist when the temperature of the battery 160 is above a threshold to allow the battery 160 to cool.

The vehicle control unit 150 may monitor one or more motor variables received from the motor 140 regarding one or more aspects of the motor 140. The motor variables may include motor performance variables such as the speed of the motor 140 and the torque currently being applied by the motor 140. The motor variables may further include motor electrical variables such as the current and voltage being applied by the motor controller 146 to the motor 140 and resistance characteristics of the motor 140. The motor variables may further include motor temperature variables that indicate the measured temperature of the motor 140 at various portions of the motor 140 such as the rotor 144 and the stator 142 as examples. For example, if the motor 140 reports that the motor is approaching a threshold temperature, or is at or above a threshold temperature, the vehicle control unit 150 may reduce the torque that the motor 140 is applying to the wheel hub 116 to reduce the heat generated by the motor 140 and allow the motor 140 to cool. In some forms, the vehicle control unit 150 determines to apply no torque to the wheel hub 116 until the temperature of the motor 140 has dropped below a certain temperature.

The vehicle control unit 150 may also control the torque applied to the wheel hub 116 via the motor 140 based on one or more vehicle operation variables received via the communication with the vehicle ECU 170. For instance, the vehicle control unit 150 may be configured to only apply torque to the wheel hub 116 when the vehicle is in a forward gear and, if the vehicle is in a reverse gear or in park, the vehicle control unit 150 may apply no torque to the wheel hub 116 via the motor 140. Likewise, if a parking brake or e-stop of the vehicle is on, the vehicle control unit 150 may apply zero torque to the wheel hub 116 via the motor 140. The vehicle control unit 150 may also receive the speed of the vehicle is traveling from the vehicle ECU 170. The vehicle control unit 150 may be configured such that if the vehicle is travelling below a certain speed (e.g., 3 mph) the vehicle control unit 150 does not apply any torque to the wheel hub 116. The vehicle control unit 150 may adjust the torque applied based on communication from the vehicle ECU 170 indicating the degree to which the accelerator is depressed. For instance, if the accelerator is not depressed, and the vehicle is traveling above a threshold speed, the vehicle control unit 150 applies a high torque to the wheel hub 116 to generate electrical power to charge the battery 160 and slow the vehicle. If the accelerator is pressed to the floor (i.e., 100% depressed) the vehicle control unit 150 may be configured to apply a reduced torque or no torque to allow the vehicle to accelerate without braking from the motor 140. In applications where a torque assist may be provided by the motor 140, the vehicle control unit 150 may monitor the demand for acceleration received from the vehicle ECU 170 and provide a torque assist when the demand is above a certain threshold. For instance, if the accelerator pedal is more than 70% depressed, the vehicle control unit 150 may cause the motor 140 to provide a torque assist to aid in acceleration.

The vehicle control unit 150 may also receive signals from the vehicle ECU 170 indicating whether the vehicle cruise control is active. If the cruise control is active, the vehicle control unit 150 may be configured to apply no braking torque or a reduced braking torque value, for example, about 25% of the torque value that would be applied if the vehicle were simply coasting (i.e., accelerator not depressed). Where cruise control is active and the vehicle is traveling above the cruise control set speed, the vehicle control unit 150 may apply a high braking torque to generate a high amount of electrical power and aid to slow the vehicle to the cruise control set speed such as if the vehicle is traveling down a mountain. In some applications, where the vehicle is traveling at a speed below the cruise control set speed, the vehicle control unit 150 may provide a torque assist to aid the vehicle in reaching the cruise control set speed such as if the vehicle is traveling up a mountain. The vehicle control unit 150 may also be configured to apply no torque if the vehicle control unit 150 receives a signal from the vehicle ECU 170 indicating the anti-lock brake system is active. This allows the anti-lock braking system to operate to slow the vehicle without interference from any braking force applied to the vehicle by the motor 140 on the wheel hub 116. The vehicle control unit 150 may also be configured to not apply any torque to the wheel hub 116 until the vehicle has been running or driving for a certain period of time. This may be done for safety reasons where the regenerative braking system 100 is installed on a trailer 106 to ensure the trailer 106 is being towed before applying a torque to avoid applying a traction torque when the trailer is disconnected from the tractor 104.

The vehicle control unit 150 may include a data structure, such as a database and/or table, to consult when determining the torque value to apply to the wheel hub 116 based on the above variables received from the motor 140, the battery 160, and the vehicle ECU 170 and/or the vehicle devices 162. These databases and tables may include or be based on performance information for the motors 140. As one example, the vehicle control unit 150 may be programmed with or able to access a table that indicates one or more torque values the motor 140 is capable of applying to the wheel hub based on the speed of the motor 140. The table may include, for example, the highest torque the motor 140 may apply at a given speed and one or more other torque values the motor 140 may apply at that speed. As another example, the vehicle control unit 150 may include a table indicating the amount of torque that the motor 140 should not exceed based on various temperatures of the motor 140 to ensure the motor 140 does not overheat.

Another example table may indicate the amount of power the motor 140 will generate based on the braking torque the motor 140 is applying to the wheel hub 116 and the speed at which the motor 140 is operating. The table may be generated using the following equation:

$$\text{Regenerated Power} = \text{Torque Applied} * \text{Motor Speed} - \text{Motor Electrical Power Loss}$$

The Motor Electrical Power Loss is a measured characteristic of the motor 140. The Motor Electrical Power Loss varies depending on the torque the motor 140 applies to the wheel hub 116 and the speed of the motor 140. The Motor Electrical Power Loss data may be supplied by the motor manufacturer and used to generate a table of Regenerated Power values that indicate the amount of electrical power the motor 140 will generate based on the torque applied and speed of the motor 140. A separate Regenerated Power table may be generated for each voltage level of the battery 160 since the torque applied by the motor 140 and Motor Electrical Power Loss may be dependent on the voltage of the battery 160 electrically coupled to the motor 140. In some applications, the voltage of the battery 160 does not affect the power generated by the motor 140 and thus separate tables for each voltage level are not needed. For instance, where the motor 140 operates at speeds less than a certain RPM the power generated by the motor 140 may be relatively independent of the voltage level of the battery 160. As another example, the Regenerated Power data may include regenerated power values that have been averaged throughout a typical range of battery voltage levels.

Figure 5A:
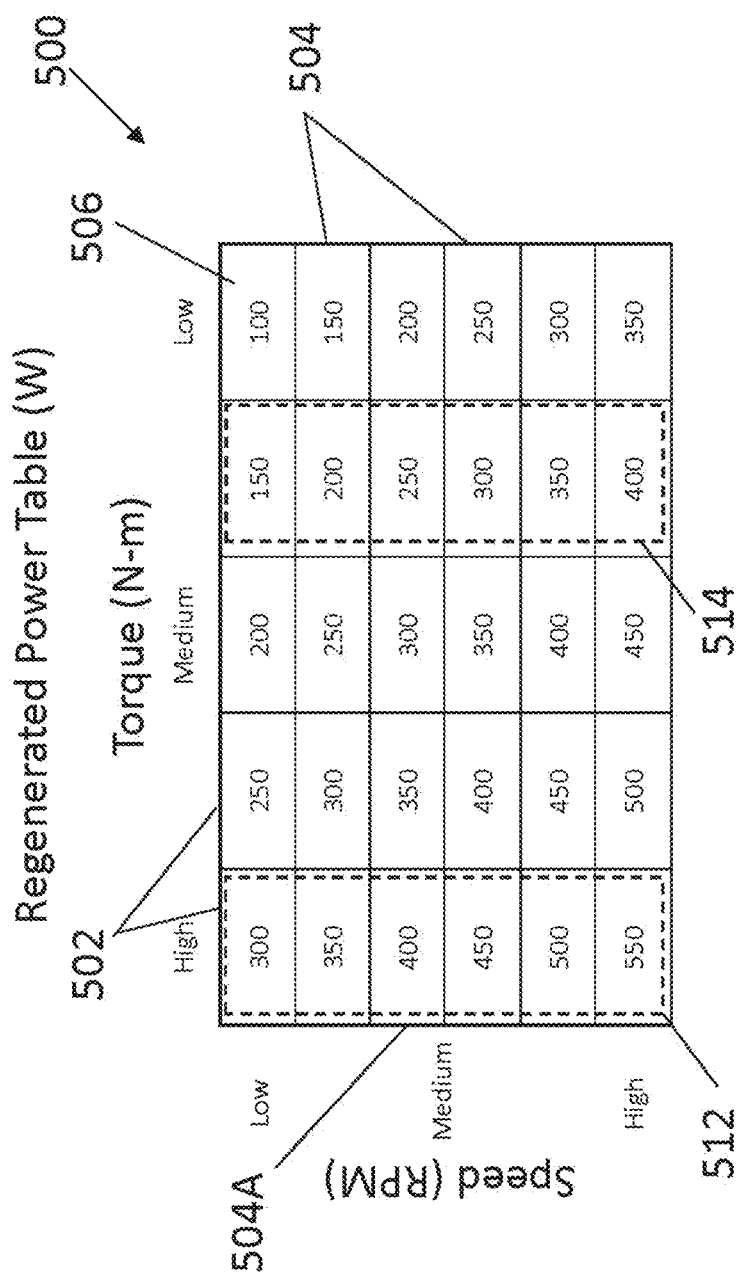
FIG. 5A is an example table of power generation values for the motor of the regenerative braking system of FIG. 3 based on the motor speed and torque output.

With reference to FIG. 5A, an example table 500 is provided including estimated Regenerated Power values using the above equation for motor 140 at various torque outputs and motor speeds. As shown, each column 502 indicates a torque the motor 140 applies to the wheel hub 116. The leftmost column includes the highest torque with the torque values decreasing in the columns to the right. Each row 504 represents a motor speed. The speed in the uppermost row of the top of the table 500 is the lowest speed of the motor 140, with the speeds of each row increasing toward the lower end of the table 500. Each cell 506 of the table 500 includes the estimated regenerated power when the torque of the column 502 is applied at the speed of the row

504. Generally, the higher the speed at any given torque, the higher the regenerated power value. Also, generally the higher the torque applied by the motor 140 to the wheel hub 116, the higher the regenerated power value produced by the motor 140.

Figure 5B:
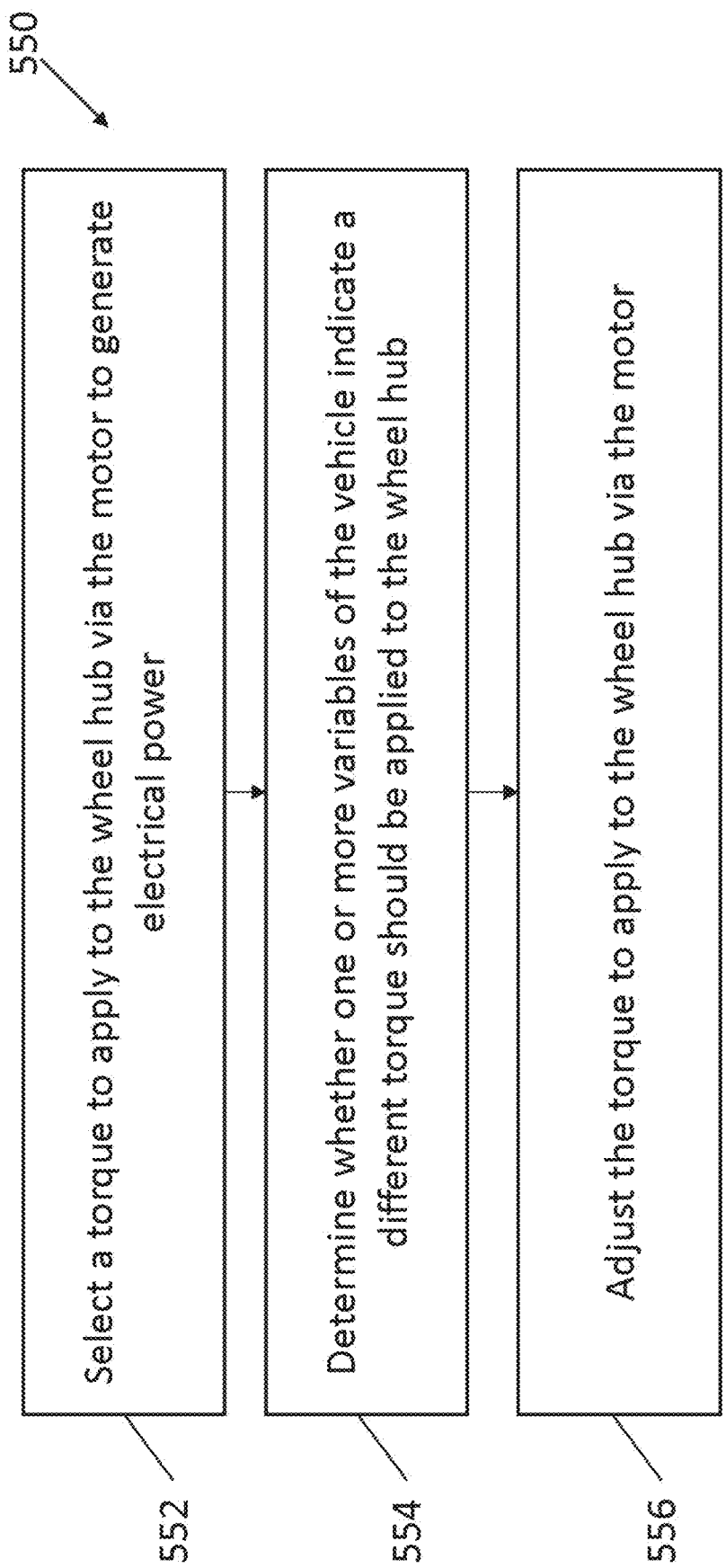
FIG. 5B is a flow diagram of an example method of controlling the torque output of the motor of the regenerative braking system of FIG. 3 using data from the table of FIG. 5A.

With reference to FIG. 5B a method 550 of selecting a torque value to apply to the wheel hub 116 is shown. In operation, the vehicle control unit 150 may select 552 a torque for the motor 140 to apply to the wheel hub 116 to generate electrical power, for example, the torque of column 512 in table 500 of FIG. 5A. The vehicle control unit 150 may select a relatively high torque value as it has generally been understood that the higher the torque value applied, the greater the power regenerated by the motor 140. Moreover, a higher torque value applied by the motor 140 to the wheel hub 116 results in a higher braking force applied to the vehicle.

The vehicle control unit 150 may determine 554 whether one or more variables of the vehicle indicate a different torque, such as a higher or lower torque, should be applied to the wheel hub 116. For example, the vehicle control unit 150 may determine that the battery 160 is almost charged (e.g., 95% charged) and/or that the battery 160 is not capable of storing the power generated by the motor 140 at the current torque value applied to the wheel hub 116 based on the speed of the motor 140. The vehicle control unit 150 may then adjust 556, such as decrease, the torque the motor 140 applies to the wheel hub 116 to cause the motor 140 to produce a lower amount of regenerated power. For example, and with reference again to the table 500 of FIG. 5A, where the current speed of the motor 140 is a medium RPM of row 504A and generates 400 W, the vehicle control unit 150 may change the torque from column 512 generating 400 W to the lower torque of column 514 to generate a lower amount of power, i.e., 250 W. Another factor the vehicle control unit 150 may consider before reducing the torque is whether the power generated by the motor 140 at the lower torque results in a low enough regenerated power value that the battery 160 is able to handle in recharging. If not, the vehicle control unit 150 may select a lower or zero torque.

As another example, the vehicle control unit 150 may determine that the battery 160 has dropped below a threshold charge level and that more power needs to be generated by the motor 140 to charge the battery 160. The vehicle control unit 150 may increase the torque applied via the motor 140 to the wheel hub 116 to increase the amount of power generated by the motor 140 to recharge the battery 160.

As another example, the vehicle control unit 150 may also determine 554 to adjust the torque applied to the wheel hub 116 based on one or more motor variables such as the temperature of the motor 140. The vehicle control unit 150 may monitor the temperature of the motor 140 received from the sensor 148 and, if the temperature exceeds a threshold value, may reduce the torque the motor 140 applies to the wheel hub 116 to reduce the heat generated by the motor 140. In some examples, the vehicle control unit 150 may reduce the torque value to zero and cause the motor 140 to generate no power via the motor 140 until the temperature of the motor 140 is below a certain threshold temperature.

As another example, the variable indicating a different torque should be applied may be a battery variable indicating that the temperature of the battery 160 is too high or the battery 160 is in an error state. The battery 160 may communicate its temperature to the vehicle control unit 150. The vehicle control unit 150 may monitor the temperature of the battery 160 and, if the temperature exceeds a threshold value, may adjust the torque the motor 140 applies to the wheel hub 116 to reduce the amount of power that is generated. The battery 160 may be able to accept a lower amount of power without increasing in temperature and continue to more slowly recharge or maintain the charge level until the battery 160 is fully charged or the battery temperature decreases. In some examples, the vehicle control unit 150 may reduce the torque value to zero and cause the motor 140 to generate no power until the temperature of the battery 160 is below a certain threshold temperature. In another form, the battery 160 may simply communicate that the battery 160 is not able to recharge based on a determination by the battery 160 that its temperature is too high. The vehicle control unit 150 may set the torque applied by the motor 140 to zero until the battery 160 communicates with the vehicle control unit 150 that the battery 160 is able to continue recharging, for example, when the battery 160 determines that the temperature has sufficiently decreased.

As another example, the vehicle control unit 150 may monitor the accessory load variable to determine whether to increase or reduce the torque applied by the motor 140. The vehicle control unit 150 may receive the accessory load variable and the battery variable, the battery variable indicating the amount of power the battery 160 is capable of handling. The vehicle control unit 150 may determine the amount of total amount of power the vehicle devices 162 require and the battery 160 are capable of handling at any given moment. The vehicle control unit 150 may then adjust the torque applied by the motor 140 to the wheel hub 116 accordingly. For instance, if the charge level of the battery 160 is low and the vehicle devices 162 are consuming power, the motor 140 may apply a high torque value to generate a high amount of power. If the charge level of the battery 160 is nearing fully charged such that the battery 160 cannot handle the full amount of power generated by the motor 140, but the vehicle devices 162 are consuming power, the vehicle control unit 150 may monitor the power consumed by the vehicle devices 162 and reduce the torque applied via the motor 140 to reduce the power generated if the vehicle devices 162 shut off or the amount of power consumed is reduced (e.g., refrigerator compressor stops running).

As another example, the vehicle control unit 150 may determine that one or more vehicle operation variables or driving conditions are present such that a lower braking force is desired. The vehicle control unit 160 may be in communication with the vehicle ECU 170. As described above, based on the signals from the vehicle ECU 170, the vehicle control unit 150 may reduce the braking force applied to the vehicle by reducing the torque the motor 140 applies to the wheel hub 116. For example, if the vehicle control unit 150 determines that the cruise control is set, the vehicle control unit 150 may select a lower torque or zero N-m for the motor 140 to apply to the wheel hub 116 to reduce the braking force applied to the vehicle to reduce drag on the vehicle.

As yet another example, the vehicle control unit 150 may receive a vehicle operation variable from the vehicle ECU 170 indicating the vehicle cruise control is active and the vehicle speed is above or below the cruise control set speed. As one example, the vehicle control unit 150 may receive the set speed of the cruise control system along with the current speed of the vehicle. Alternatively, the vehicle control unit 150 may receive the set speed of the cruise control along with an indication of whether the vehicle is accelerating or decelerating. Based on this information, the vehicle control unit 150 may reduce the torque applied by the motor 140 if the vehicle is accelerating or the speed of the vehicle is below the set speed of the cruise control. The vehicle control unit 150 may likewise increase the torque applied by the motor 140 if the vehicle is decelerating or the speed of the vehicle is above the set speed of the cruise control. Thus, the vehicle control unit 150 aids in the operation of the vehicle 150 by reducing the torque applied by the motor 140 to allow the vehicle to accelerate and increases the torque to aid in slowing the vehicle. Increasing the torque to aid in slowing the vehicle may also result in the generation of more electrical power due to the increase in torque applied via the motor 140 to the wheel hub 116.

Another example table may indicate the amount of power the motor 140 will use or consume based on the propelling or driving torque the motor 140 is applying to the wheel hub 116 and the speed at which the motor 140 is operating. The table may be generated using the following equation:

Power Consumption=Torque Applied*Motor Speed+ Motor Electrical Power Loss

The Motor Electrical Power Loss is the measured characteristic of the motor 140 as described above. The Motor Electrical Power Loss may vary depending on the torque the motor 140 applies to the wheel hub 116 and the speed of the motor 140. The Motor Electrical Power Loss data may be supplied by the motor manufacturer and used to generate a table of Power Consumption values that indicate the amount of electrical power the motor 140 will consume based on the torque applied and speed of the motor 140. A separate Power Consumption table may be generated for each voltage level of the battery 160 since the torque applied by the motor 140 and Motor Electrical Power Loss may be dependent on the voltage of the battery 160 electrically coupled to the motor 140. In some applications, the voltage of the battery 160 does not substantially affect the power generated by the motor 140 and thus separate tables for each voltage level are not needed. For instance, where the motor 140 operates at speeds less than a certain RPM the power consumed by the motor 140 in applying the torque assist may be relatively independent of the voltage level of the battery 160. As another example, the Power Consumption data may include power consumption values that have been averaged throughout a typical range of battery voltage levels.

With reference to FIG. 6A, an example table 600 is provided including estimated Power Consumption values using the above equation for motor 140 at various torque outputs and motor speeds. As shown, each column 602 indicates a torque the motor 140 applies to the wheel hub 116. The leftmost column includes the lowest torque with the torque values increasing in the columns to the right. Each row 604 represents a motor speed. The speed in the uppermost row of the top of the table 600 is the lowest speed of the motor 140, with the speeds of each row increasing toward the lower end of the table 600. Each cell 606 of the table 600 includes the estimated power consumption value when the torque of the column 602 is applied at the speed of the row 604. Generally, the higher the speed at any given torque, the higher the power consumption value. Also, generally the higher the torque applied by the motor 140 to the wheel hub 116, the higher the amount of power consumed by the motor 140.

Figure 6B:
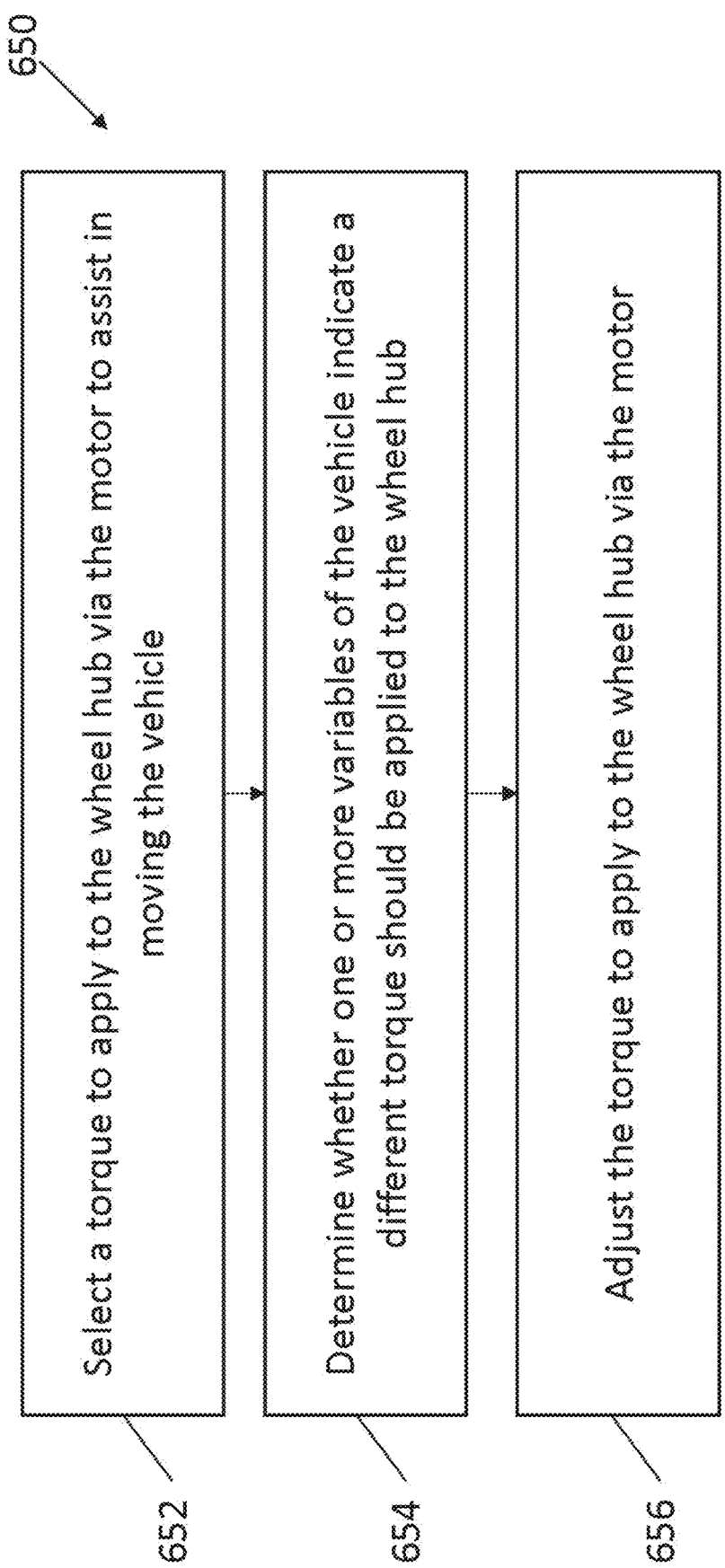
FIG. 6B is a flow diagram of an example method of controlling the torque output of the motor of the regenerative braking system of FIG. 3 using data from the table of FIG. 6A.

With reference to FIG. 6B a method 650 of selecting a torque value to apply to the wheel hub 116 to provide a torque assist is shown. In operation, the vehicle control unit 150 may select 652 a torque for the motor 140 to apply to the wheel hub 116 to assist in moving the vehicle, for example, the torque of column 612 in table 600 of FIG. 6A. The vehicle control unit 150 may select a relatively high torque value to provide a large amount of torque to increase the amount of assistance provided by the motor 140 in moving the vehicle.

The vehicle control unit 150 may determine 654 whether one or more variables of the vehicle indicate a different torque, such as a higher or lower torque, should be applied to the wheel hub 116. For example, the vehicle control unit 150 may determine that the charge level of the battery 160 is low or below a threshold charge level (e.g., 50%). The vehicle control unit 150 may adjust 656, such as decrease, the amount of torque assist provided to reduce the draw of power from the battery 160. In some forms, the vehicle control unit 150 may reduce the torque applied to zero once the charge level of the battery 160 falls below a threshold value. For example, and with reference to table 600 of FIG. 6A, if where the current speed of the motor is a medium RPM of row 604A, the vehicle control unit 150 may change the torque from column 612 where the motor 140 is consuming 400 W to the lower torque of column 614 to consume a lower amount of power, i.e., 250 W, while still providing a torque assist. Conversely, if the charge level of the battery 160 increases above a threshold value, the vehicle control unit 150 may adjust 656 the torque applied to increase the torque applied to the wheel hub 116.

As another example, the vehicle control unit 150 may also determine 654 to adjust the torque applied to the wheel hub 116 based on one or more motor variables such as the temperature of the motor 140. The vehicle control unit 150 may monitor the temperature of the motor 140 received from the sensor 148 and, if the temperature exceeds a threshold value, may reduce the torque the motor 140 applies to the wheel hub 116 to reduce the heat generated by the motor 140. In some examples, the vehicle control unit 150 may reduce the torque value to zero and cause the motor 140 to apply no torque until the temperature of the motor 140 is below a certain threshold temperature.

As another example, the variable indicating a different torque should be applied may be a battery variable indicating that the temperature of the battery 160 is too high or the battery 160 is in an error state. The battery 160 may communicate its temperature to the vehicle control unit 150. The vehicle control unit 150 may monitor the temperature of the battery 160 and, if the temperature exceeds a threshold value, may adjust the torque the motor 140 applies to the wheel hub 116 to reduce the amount of torque assist that is provided. The battery 160 may be able to provide a lower amount of power without increasing in temperature and continue to more slowly deliver power to the motor 140 while the battery 160 temperature decreases. In some examples, the vehicle control unit 150 may reduce the torque value to zero and cause the motor 140 to apply no torque assist until the temperature of the battery 160 is below a certain threshold temperature. In another form, the battery 160 may simply communicate that the battery 160 is not able to deliver power to the motor 140 based on a determination by the battery 160 that its temperature is too high. The vehicle control unit 150 may set the torque applied by the motor 140 to zero until the battery 160 communicates with the vehicle control unit 150 that the battery 160 is able to continue providing torque assist, for example, when the battery 160 determines that the temperature has sufficiently decreased.

As another example, the vehicle control unit 150 may determine that one or more vehicle operation variables or driving conditions are present such that a higher or lower torque assist is desired. The vehicle control unit 150 may be in communication with the vehicle ECU 170. For example, if the vehicle control unit 150 determines the vehicle is accelerating, the vehicle control unit 150 may increase the torque assist provided by the motor 140. As another example, if the vehicle control unit 150 determines that the cruise control is set, the vehicle control unit 150 may increase the torque assist if the vehicle control unit 150 determines that the vehicle is below the cruise control set speed or accelerating to the cruise control set speed. If the vehicle control unit 150 determines the vehicle is traveling at a speed higher than the cruise control set speed the vehicle control unit may reduce the torque assist or provide no torque assist.

With respect to FIG. 7, the vehicle control unit 150 may include a table 700 of regenerated power values calculated similar to the regenerated power values of table 500 of FIG. 5A including a power loss region 720. When the motor 140 applies a braking torque to the wheel hub 116, the motor 140 generates electrical power above a certain speed and consumes or loses electrical power when operating below that speed. For example, the motor 140 may generate electrical power when high torque is applied at a medium speed (see cell 706A) but the motor 140 will consume electrical power when applying the high torque at a low speed (see cell 706B).

For conciseness and clarity, similar features of FIG. 5A are shown in FIG. 7 with similar reference numerals, with the prefix "5" changed to "7." For example, a feature of FIG. 5A indicated by reference numeral 502 is indicated by reference numeral 702 in FIG. 7. In table 700, each column 702 represents a set torque the motor 140 applies to the wheel hub 116. Each row 704 indicates a speed at which a rotor of the motor 140 rotates. Each cell 706 indicates the estimated amount of electrical power the motor 140 will generate at the torque of the column 702 and the speed of the row 704 of the cell 706. Region 718 includes cells with positive power values that indicate that the motor 140 will generate electrical power at the indicated speeds when applying the indicated torque. Table 700 further includes the power loss region 720 indicating the speeds at which the motor 140 consumes power when applying a certain torque, rather than generating power. For instance, when applying a set torque (e.g., a high torque) to the wheel hub 116 as the vehicle slows, the motor 140 is not able to generate power when the motor 140 is turning at or below a certain speed (e.g., a low speed). Instead, at speeds within region 720, the motor 140 begins consuming or using power from the battery 160 to maintain the torque applied to the wheel hub 116 rather than generating power.

The one or more variables considered by the vehicle control unit 150 may include a power loss variable indicating whether the motor 140 will operate in the power loss region 720 based on a motor speed and torque value. More specifically, based on the table of FIG. 7, the vehicle control unit 150 may be configured to reduce the torque applied by the motor 140 once the speed of the motor 140 reaches the region 720 wherein the motor 140 consumes, rather than generates, electrical power. This enables the regenerative braking system 100 to continuously apply the greatest amount of braking force without consuming electric power stored in the battery 160 to slow the vehicle.

Figure 8:
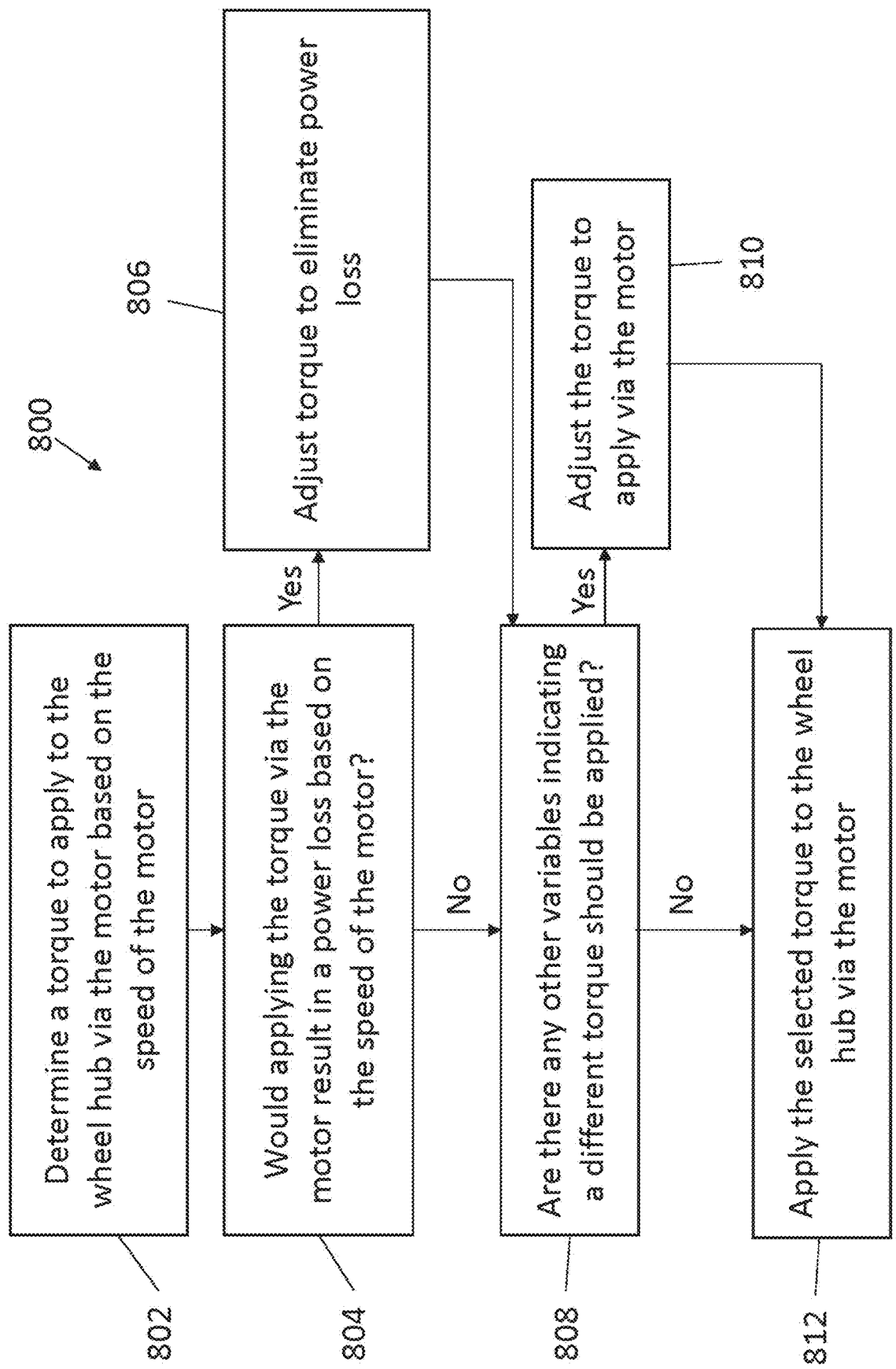
FIG. 8 is a flow diagram of an example method of controlling the torque output of the motor of the regenerative braking system of FIG. 3 using data from the table of FIG. 7.

With reference to FIG. 8, a method 800 of controlling the torque applied by the motor 140 to the wheel hub 116 is shown. Initially, the vehicle control unit 150 determines 802 a torque for the motor 140 to apply to the wheel hub 116 based on the speed of the motor 140 to generate electrical power and apply a braking force to the vehicle. The vehicle control unit 150 may determine the maximum torque the motor 140 is able to apply at the current motor 140 speed as discussed above.

The vehicle control unit 150 uses the current speed of the motor 140 and determines 804 whether applying the torque selected at step 802 via the motor 140 would result in a power loss based on the speed of the motor 140. In one approach, the vehicle control unit 150 determines 804 whether operating the motor 140 would result in a power loss, with the motor 140 consuming rather than generating electrical power, by identifying whether the torque selected at step 802 is in the power loss region 720 of the table 700. As another example, the vehicle control unit 150 identifies whether the torque selected at step 802 results in a Regenerative Power value below a threshold value (e.g. zero watts).

If the vehicle control unit 150 determines at step 804 that applying the torque selected at step 802 results in the motor 140 is generating no electrical power or consuming electrical power based on the speed of the motor 140, the vehicle control unit 150 adjusts 806 the torque applied by the motor 140 such as by decreasing the torque. The adjusting 806 may include the vehicle control unit 150 determining a torque value that will result in power generation and apply that torque to the motor 140. The vehicle control unit 150 may determine whether the selected torque will result in power generation by consulting a table similar to table 700 or a similar data structure.

For example, the vehicle control unit 150 may start at the torque in table 700 selected at step 802, then progressively move from column 702 to column 702 in a decreasing torque direction until a positive regenerative power value is identified. For example, at a low motor speed, e.g., the second row 704, the vehicle control unit 150 may initially select a high torque at step 802 to maximize torque. However, the vehicle control unit 150 determines at step 804 the selected high torque value results in a regenerative power value of −424 W in the power loss region 720. At step 806, the vehicle control unit 150 then evaluates the power regeneration values at possible torque values at the low motor speed, i.e., the second row 704, until identifying a medium torque value that produces a positive Regenerative Power value at (e.g. 38 W). The vehicle control unit 150 may then adjust 806 the torque demand for the motor 140 to the medium torque value rather than the high torque value so that the motor generates 38 W rather than consuming 424 W. In another approach, the adjusting 806 includes identifying one or more torque values, such as a range of torque values, that result in a positive power generation. The vehicle control unit 150 may continue to monitor the speed of the motor 140 and adjust, e.g., reduce, the torque whenever the motor 140 is no longer generating power.

Upon adjusting 806 the torque to a torque value that will not result in power loss or determining at step 804 that the selected torque will not result in a power loss at the current speed of the motor 140, the vehicle control unit 150 may optionally determine 808 whether there are any other variables that indicate that a different torque should be applied to the wheel hub 116 via the motor 140. This determination may be similar to step 554 described in detail above with regard to FIG. 6. The vehicle control unit 150 may consider at least one of the vehicle operational variables, battery variables, motor variables other than speed, power consumption variables, and orientation variables to determine whether to apply a different torque via the motor 140 than the torque selected at step 802 or step 806. If there are one or more variables indicating a different torque should be applied, the vehicle control unit 150 adjusts 810 the torque to apply via the motor 140 based on the variables as described above. For instance, if the temperature of the motor 140 is high, the vehicle control unit 150 may further reduce the torque value for the motor 140 to apply to the wheel hub 116. As another example, if the vehicle control unit 150 determines the vehicle is traveling up an incline, the vehicle control unit 150 may further reduce the torque value to be applied by the motor 140 to reduce the drag or braking force the motor 140 applies to the vehicle. The vehicle control unit 150 may be configured so that any adjustments 810 made to the selected torque value based on the variables do not result in a power loss.

The vehicle control unit 150 may then send the selected torque value to the motor controller 146 to cause the motor 140 to apply 812 the selected torque to the wheel hub 116. The vehicle control unit 150 may continually or periodically perform method 800 to identify the torque to request from the motor. For example, the vehicle control unit 150 may perform method 800 upon expiration of a timer, upon a change of motor speed greater than a predetermined threshold (e.g. 50 RPM), and/or in response to a vehicle event such as cruise control being turned off.

The vehicle control unit 150 may monitor the speed of the motor 140 and determine if increasing the torque applied by the motor 140 based on the current speed will result in a power loss. For example, the vehicle control unit 150 may be configured to request the greatest amount of torque the motor 140 is able to apply, without resulting in a power loss, at a given speed of the motor 140. If the vehicle control unit 150 determines increasing the torque to a certain torque applied by the motor 140 to the wheel hub 116 results in power generation by the motor 140 and not a power loss, the vehicle control unit 150 may increase the torque of the motor 140 to that torque value.

Figure 9:
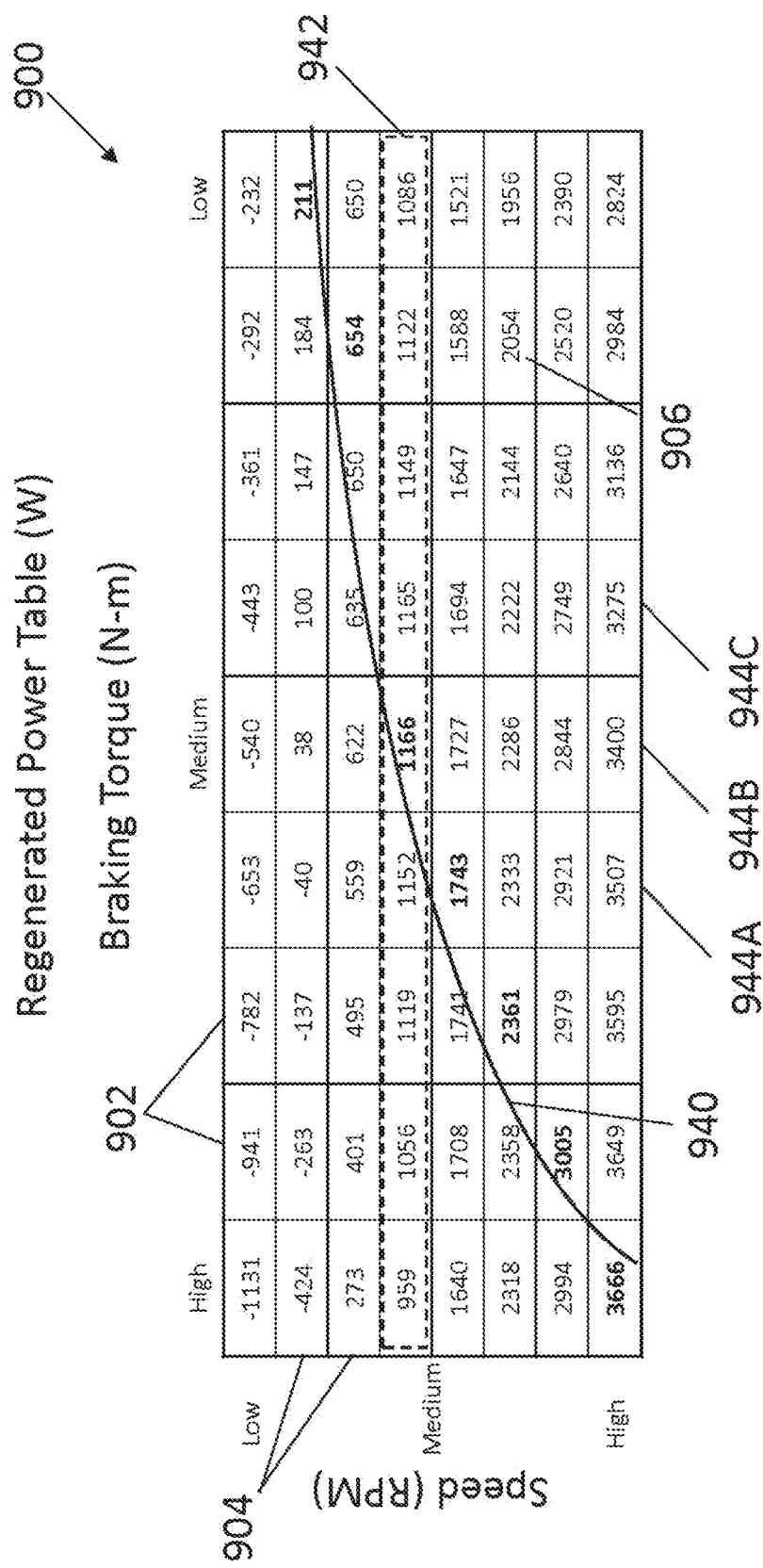
FIG. 9 is an example table of power generation values for the motor of the regenerative braking system of FIG. 3 including an optimal power regeneration line.

With respect to FIG. 9, the vehicle control unit 150 may include a table 900 which is similar in many respects to table 700, the differences being highlighted in the following discussion. For conciseness and clarity, similar features of FIG. 7 are shown in FIG. 9 with similar reference numerals, with the prefix "7" changed to "9." For example, a feature of FIG. 7 indicated by reference numeral 702 is indicated by reference numeral 902 in FIG. 9. Table 900 includes an optimal power generation line 940 for the motor 140 to apply to the wheel hub 116 to generate the maximum amount of electrical power based on the speed of the motor 140. As the speed of the motor 140 slows while a set torque is applied (i.e., traveling up along any given column 902), there comes a point where applying a lower torque value will result in the same and/or higher power value due to electrical losses in the motor 140. Thus, when the motor 140 slows to a certain speed, more power may be generated by lowering the torque applied to the wheel hub 116 rather than maintaining the same high torque as the vehicle slows. In other words, at a set speed there is a torque value that will result in the maximum regenerated electrical power for that speed that is not necessarily the highest torque value.

Figure 10:
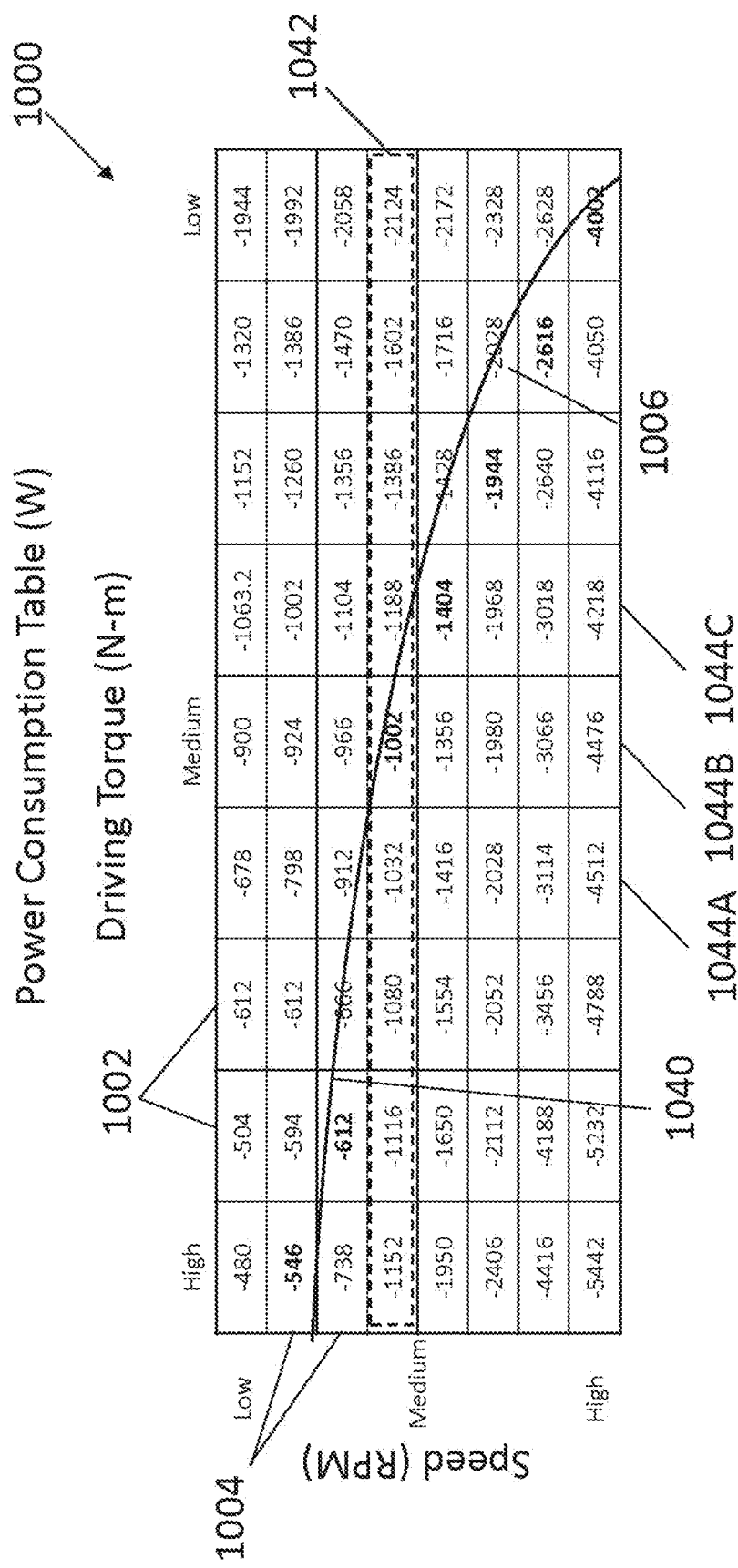
FIG. 10 is an example table of power consumption values for the motor of the regenerative braking system of FIG. 3 including an optimal power consumption line.

As an example with reference to table 900 of FIG. 9, traveling across the medium speed row 942, applying a torque of column 944A results in 1152 W, applying a torque of column 944B results in 1166 W, and applying a torque of column 944C results in 1165 W. Applying the torque of column 944B thus results in the greater amount of regenerated power than the higher torque value of column 944A due in part to lower motor power loss at the lower torque value of column 944B. Thus, to generate the maximum amount of power to charge the battery 160, the torque selected for the motor 140 to apply to the wheel hub 116 may be selected using the speed of the motor 140 and determining which torque value results in the greatest amount of regenerated power at that speed. The vehicle control unit 150, receiving the current speed of the motor 140, may look at table 900 to determine the torque that should be applied to the wheel hub 116 to generate the greatest amount of electrical power that the motor 140 is capable of generating at the current speed. The vehicle control unit 150 may select the torque value associated with cell 906 of the row 904 representing the current speed of the motor 140 that is intersected by the optimal power generation line 940. In another form, the vehicle control unit 150 may compare the power regeneration values of each cell 906 within a row 904 representing the current speed of the motor 140 and select the torque value of the column 902 of the cell 906 containing the highest power regeneration value. Alternatively, the vehicle control unit 150 may store a function of the optimal power generation line 940 calculated for the motor 140. Upon receiving the speed of the motor 140, the vehicle control unit 150 may enter the speed into the function to determine the optimal motor torque demand to apply to generate the maximum amount of electrical power. With reference to FIG. 10, the vehicle control unit 150 may include a table 1000 which is similar in many respects to table 900, the differences being highlighted in the following discussion. For conciseness and clarity, similar features of FIG. 9 are shown in FIG. 10 with similar reference numerals, with the prefix "9" changed to "10." For example, a feature of FIG. 9 indicated by reference numeral 902 is indicated by reference numeral 1002 in FIG. 10.

Table 1000 includes an optimal power consumption line 1040 for the motor 140 when applying a torque to the wheel hub 116 to assist in moving the vehicle based on the speed of the motor 140. The optimal power consumption line 1040 indicates the torque that the motor 140 should apply to the motor 140 given the speed of the vehicle that results in the consumption of the least amount of power. In other words, for any given speed of the vehicle, there is a torque value that the motor 140 can apply to assist the movement of the vehicle that requires the least amount of power.

As an example with reference to table 1000 of FIG. 10, traveling across the medium speed row 1042, applying a torque of column 1044A results in consuming 1032 W, applying a torque of column 1044B results in consuming 1002 W, and applying a torque of column 1044C results in consuming 1188 W. Applying the torque of column 1044B thus results in consuming the least amount of power to apply a torque to assist in moving the vehicle when compared to using the torques of column 1044A or 1044C or any other column at the speed of row 1042. This is due in part to the lower motor power loss at the torque value of column 1044B at that speed of rotation of the motor 140. Thus, to provide a torque assist while using the least amount of power from the battery 160, the torque selected for the motor 140 to apply to the wheel hub 116 may be selected using the speed of the motor 140 and determining which torque value results in the using the least amount of power at that speed. The vehicle control unit 150, receiving the current speed of the motor 140, may look at table 1000 to determine the torque that should be applied to the wheel hub 116 to consume the least amount of electrical power while providing a torque assist to the vehicle. The vehicle control unit 150 may select the torque value associated with cell 1006 of the row 1004 representing the current speed of the motor 140 that is intersected by the optimal power consumption line 1040. In another form, the vehicle control unit 150 may compare the power consumption values of each cell 1006 within a row 1004 representing the current speed of the motor 140 and select the torque value of the column 1002 of the cell 1006 containing the lowest power consumption value. Alternatively, the vehicle control unit 150 may store a function of the optimal power consumption line 1040 calculated for the motor 140. Upon receiving the speed of the motor 140, the vehicle control unit 150 may enter the speed into the function to determine the optimal motor torque to apply to provide a torque assist while consuming the least amount of electrical power.

Figure 11:
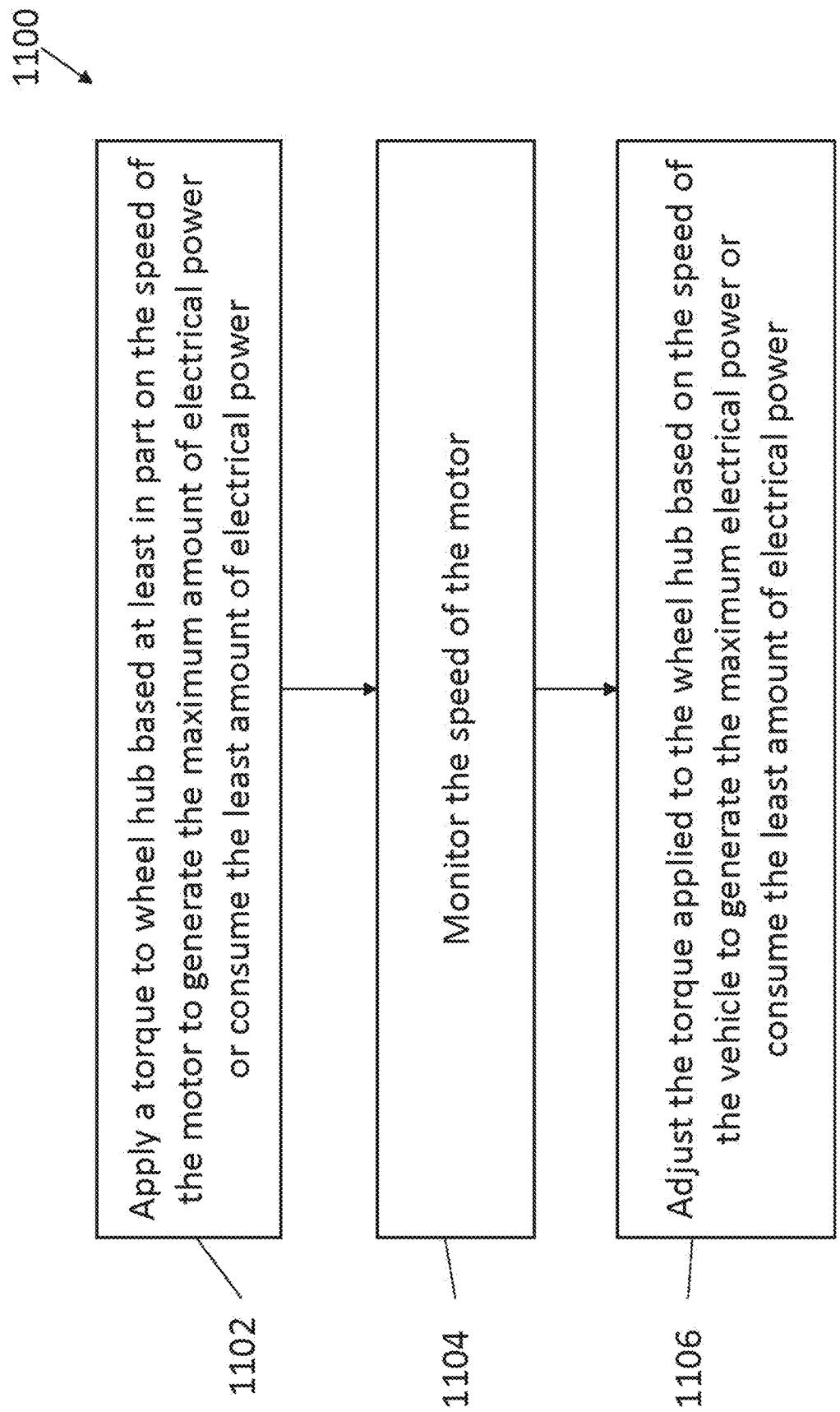
FIG. 11 is a flow diagram of an example method of controlling the torque output of the motor of the regenerative braking system of FIG. 3 using data from the tables of FIGS. 9 and 10.

With reference to FIG. 11, a method 1100 of controlling the torque applied by the motor 140 to the wheel hub 116 is shown. The vehicle control unit 150 selects 1102 a torque to apply to the wheel hub 116 via the motor 140 based on the speed of the motor 140 to generate the greatest amount of electrical power or to apply a torque assist while consuming the least amount of electrical power. As described above, the vehicle control unit 150 may determine the torque that generates the greatest amount of electrical power based on table 900 or another data structure containing information similar to table 900. Likewise, the vehicle control unit 150 may determine the torque value to apply a torque assist that consumes the least amount of electrical power based on table 1000 or another data structure containing information similar to table 1000. For instance, the vehicle control unit 150 may enter the current speed of the motor 140 received from a sensor 148 of the motor 140 into a program, function, and/or lookup table that provides the torque resulting in the highest power generation for the motor or the least power consumption for providing a torque assist based on the speed input of the motor 140. The vehicle control unit 150 may then continue to monitor 1104 the speed of the motor 140. The vehicle control unit 150 may communicate with a speed sensor 148 of the motor 140 to receive the current speed value of the motor 140. In some forms, the vehicle control unit 150 may check the speed of the motor 140 after a certain period of time, for example, every second. If the speed of the motor 140 changes, the vehicle control unit 150 may adjust 1106 the torque applied to the wheel hub 116 based on the speed of the motor 140 to generate the greatest amount of electrical power or to consume the least amount of electrical power similar to the step of applying 1002 described above. In some forms, the vehicle control unit 150 may adjust the torque applied by the motor 140 after the speed changes a threshold amount, for example, an increase or decrease of 40 RPMs. In other forms, the vehicle control unit 150 may be configured to apply a certain torque for certain motor speed ranges rather than continuously adjusting the torque to the optimal value based on the current motor speed.

While the above example methods describe the selection of the torque value applied by the motor 140 to the wheel hub 116 based solely on the electrical power generation/consumption values and/or the speed of the motor 140, the above methods may be incorporated into the vehicle control unit 150 along with the other considerations of the vehicle control unit 150 in selecting the torque. For instance, when there are no other circumstances indicating a different torque should be applied (such as, e.g., motor temperature too high, battery charge level is low/full, anti-lock braking system active, etc.) the vehicle control unit 150 may be configured to set the torque output of the motor 140 to generate the maximum amount of power or consume the least amount of power as described in regard to FIG. 11. The vehicle control unit 150 may be configured to first determine the torque to apply based on the speed of the motor 140 using any one of the example methods described above, and then determine whether there are any other variables of the motor 140, battery 160, or the vehicle (e.g., provided by the vehicle ECU 170) indicating the torque should be increased, reduced, or set to zero.

Figure 12:
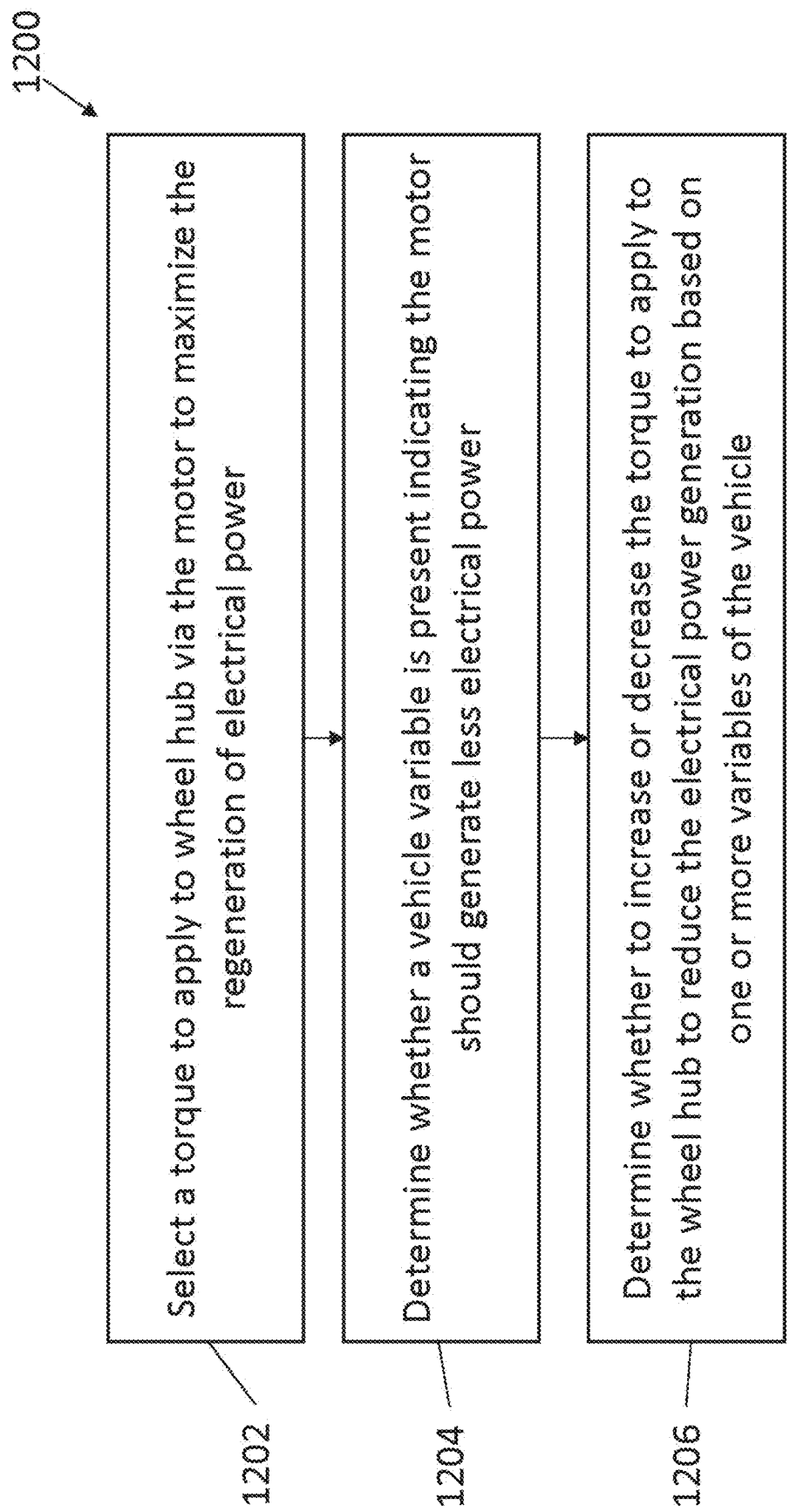
FIG. 12 is a flow diagram of an example method of controlling the torque output of the motor of the regenerative braking system of FIG. 3 based on one or more variables of the vehicle.

With respect to FIG. 12, an example method 1200 of controlling the torque applied by the motor 140 to generate electrical power is provided. The vehicle control unit 150 selects 1202 a torque to apply to the wheel hub 116 to generate the maximum amount of electrical power. The vehicle control unit 150 may select the torque that generates the maximum amount of electrical power based on one or more variables, such as the speed of the motor 140, for example, using the table 900 of FIG. 9. The vehicle control unit 150 may monitor the inputs received from the motor 140, the battery 160, and the vehicle ECU 170 to determine 1204 whether there is a vehicle variable requiring the generation of less electrical power. As one example, when the battery 160 reports that the charge level of the battery 160 is above a threshold value (e.g., 90%), the battery 160 may only be able to handle a certain amount of power to continue to recharge the battery 160. Thus, if the vehicle control unit 150 determines that the selected torque would cause the motor 140 to generate more electrical power than the battery 160 can handle to recharge the battery 160, the vehicle control unit 150 may determine to generate less electrical power. As another example, the vehicle control unit 150 may determine that the temperature of the battery 160 is too high or above a certain threshold. To reduce the heat generated by the battery 160, the vehicle control unit 150 may reduce the power generated by the motor 140 to reduce the amount of power the battery 160 stores.

The vehicle control unit 150 then determines 1206 whether to increase or decrease the torque applied to the wheel hub 116 to reduce the electrical power generation based on whether an increase or decrease in torque aids in operation of the vehicle. For instance, with reference to table 900, where the motor 140 has a speed of row 942 and the current torque selected by the vehicle control unit 150 is the torque of column 944B, the power output by the motor is 1166 W. Increasing the torque to the torque of column 944A results in a power output of 1152 W and decreasing the torque to the torque of column 944C results in a power output of 1165 W. Thus, the vehicle control unit 150 can increase or decrease the torque applied by the motor 140 to reduce the amount of power generated by the motor 140.

As one example, the vehicle control unit 150 may determine 1106 to increase or decrease the torque based on communication with the vehicle ECU 170. If the data received from the vehicle ECU 170 indicates that cruise control is active and the vehicle is accelerating to the cruise control set speed or traveling at a speed below the cruise control set speed, the vehicle control unit 150 may determine to decrease the torque applied to the wheel hub 116 to reduce the electrical power generated by motor 140 and while reducing the braking force applied to the vehicle as the vehicle accelerates to the cruise control set speed. This permits the vehicle to accelerate with less drag from the regenerative braking system 100. The vehicle control unit 150 may similarly be configured to decrease the torque if the vehicle ECU 170 indicates the vehicle is traveling at the cruise control set speed to decrease the power generated by the motor 140. This also reduces the braking force applied by the motor 140 reducing the power required by the vehicle motor to maintain the cruise control set speed which may reduce the amount of energy consumed by the vehicle.

If the vehicle ECU 170 indicates that the vehicle is traveling at a speed above the cruise control set speed, the vehicle control unit 150 may be configured to select a higher torque value that produces a lower amount of electrical power while aiding in braking or slowing the vehicle to bring the speed of the vehicle down to the cruise control set speed.

The vehicle control unit 150 may also be configured to increase the torque applied by the motor 140 on the wheel hub 116 from the torque that produces the optimal power generation value on line 940 when the vehicle is determined to be braking or the vehicle operator is coasting and is not engaging the accelerator pedal. The vehicle control unit 150 may receive this information via communication with the vehicle ECU 170. As another example, the vehicle control unit 150 may be configured to decrease the torque applied by the motor 140 if the operator of the vehicle is accelerating. As yet another example, the vehicle control unit 150 may also determine to decrease the torque applied by the motor 140 if the temperature of the motor 140 is above a threshold temperature to allow the motor 140 to cool.

The vehicle control unit 150 may continue to monitor the variables of the vehicle to determine whether the power generated by the motor 140 needs to be increased again. For instance, if the vehicle device(s) 162 (e.g., a refrigeration unit of the vehicle) turns on and begins drawing electrical power, the power generated by the motor 140 may be increased to aid in providing power to the vehicle device(s) 162 and reduce the draw of power from the battery 160. As another example, the battery 160 may be used to power the vehicle device(s) 162. Once the charge level of the battery 160 drops below a threshold value or the battery 160 is able to handle more power during recharging than the motor 140 is currently producing, the torque of the motor 140 may be adjusted to provide the maximal power the battery 160 is able to handle and/or that the motor 140 is able to generate.

In one embodiment, the vehicle control unit 150 has stored therein has an algorithm, such as computer-readable instructions to utilize one or more equations or neural networks, that reflects the optimal power generation line 940 and the optimal power consumption line 1040 for the vehicle. The algorithm uses historical data for the motor power and the electrical power loss of the motor at the varying motor speeds and torques of the tables 900, 1000 as well as a varying battery bus voltages. In operation, the vehicle control unit 150 uses motor speed and battery bus voltage as inputs to the algorithm to identify an initial optimum torque for regenerative braking or propulsion that corresponds to the torque value identified by the optimal power generation line 940 or optimal power consumption line 1040 (depending on regenerative braking or vehicle propulsion mode of the system) at the motor speed. The vehicle control unit 150 checks whether there is a variable indicating a different torque should be applied similar to operation 808 in FIG. 8. The vehicle control unit 150 then either applies the initial optimum torque or applies an adjusted torque based on the variable indicating a different torque should be applied.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A method of operating a vehicle system of a vehicle, the vehicle system comprising a motor, a battery, and a controller, the vehicle system configured to provide at least one of regenerative braking wherein the motor operates to charge the battery and propulsion wherein the motor uses electrical power from the battery to propel the vehicle, the method comprising:
at the controller:
determining an effective motor power for regenerative braking or propulsion of the vehicle at a motor speed and a motor torque based at least in part on a calculated motor power corresponding to the motor speed and the motor torque and an electrical power loss of the motor corresponding to the motor speed and motor torque; and
causing the motor to apply the motor torque to a wheel of the vehicle upon the effective motor power satisfying an operating condition of the vehicle system.

2. The method of claim 1 wherein determining the effective motor power comprises:
determining the calculated motor power based at least in part upon the motor speed and the motor torque; and
determining the electrical power loss of the motor based at least in part upon a data structure including information representative of electrical power loss of the motor at a plurality of motor speeds and a plurality of motor torques.

3. The method of claim 1 wherein the motor is operable to provide a plurality of torque values at the motor speed, the torque values including a maximum efficiency torque value wherein the motor operates at a maximum efficiency for the motor speed; and
wherein causing the motor to apply the motor torque to the wheel comprises causing the motor to apply a torque that is different than the maximum efficiency torque.

4. The method of claim 1 wherein the vehicle system is configured to provide regenerative braking for the vehicle; and
wherein determining the effective motor power comprises subtracting the electrical power loss of the motor from the calculated motor power.

5. The method of claim 1 wherein the vehicle system is configured to provide regenerative braking; and
wherein the operating condition comprises the calculated motor power being greater than the electrical power loss of the motor.

6. The method of claim 1 wherein the vehicle system is configured to provide regenerative braking; and
wherein the operating condition comprises maximizing the effective motor power at the motor speed.

7. The method of claim 1 wherein the vehicle system is configured to provide propulsion for the vehicle; and
wherein determining the effective motor power comprises adding the electrical power loss of the motor and the calculated motor power.

8. The method of claim 1 wherein the vehicle system is configured to provide propulsion for the vehicle; and
wherein the operating condition comprises minimizing the effective motor power.

9. The method of claim 1 further comprising:
receiving a variable indicative of operation of the vehicle;

determining an adjusted torque based at least in part on the motor torque and the variable; and wherein causing the motor to apply the motor torque comprises causing the motor to apply the adjusted torque.

10. The method of claim 9 wherein the variable is indicative of at least one of:
operation of a friction brake of the vehicle;
status of a transmission of the vehicle;
vehicle orientation;
vehicle speed;
temperature of the motor;
battery status; and
battery bus voltage.

11. The method of claim 1 wherein determining the effective motor power at the motor speed and the motor torque is based at least in part on the calculated motor power and the electrical power loss of the motor corresponding to the motor speed, the motor torque, and a battery bus voltage.

12. The method of claim 1 wherein the motor includes a stator fixed relative to a spindle of the vehicle and a rotor secured to a wheel hub connected to the wheel; and
wherein causing the motor to apply the motor torque to the wheel of the vehicle comprises the rotor of the motor applying a torque to the wheel hub.

13. A method of operating a vehicle system for a vehicle, the vehicle system comprising a motor, a battery, and a controller, the vehicle system configured to provide at least one of regenerative braking wherein the motor operates to charge the battery and propulsion wherein the motor uses electrical power from the battery to propel the vehicle, the method comprising:
at the controller:
determining an effective motor power at a motor speed and a motor torque based at least in part on a calculated motor power and an electrical power loss of the motor corresponding to the motor speed and motor torque; and
causing the motor to apply the motor torque to a wheel of the vehicle upon the effective motor power satisfying an operating condition of the vehicle system;
wherein determining the effective motor power at the motor speed and motor torque comprises:
determining a first effective motor power at the motor speed and a first motor torque based at least in part on a first calculated motor power and a first electrical power loss corresponding to the motor speed and the first motor torque; and
determining a second effective motor power at the motor speed and a second motor torque based at least in part on a second calculated motor power and a second electrical power loss corresponding to the motor speed and the second motor torque; and
wherein causing the motor to apply the motor torque to the wheel comprises:
causing the motor to apply the first motor torque to the wheel upon the first effective motor power satisfying the operating condition; and
causing the motor to apply the second motor torque to the wheel upon the second effective motor power satisfying the operating condition.

14. The method of claim 13 wherein the first motor torque is greater than the second motor torque;
wherein the second effective motor power is greater than the first effective motor power; and
wherein the second effective motor power satisfies the operating condition.

15. The method of claim 1 wherein determining the effective motor power at the motor speed and the motor torque includes determining a first effective motor power at a first motor speed and a first motor torque and determining a second effective motor power at a second motor speed and a second motor torque; and
wherein causing the motor to apply the motor torque to the wheel of the vehicle comprises:
causing the motor to apply the first motor torque associated with the first effective motor power upon the motor operating at the first motor speed; and
causing the motor to apply the second torque associated with the second effective motor power upon the motor operating at the second motor speed.

16. The method of claim 1 wherein the vehicle system is configured to provide regenerative braking and propulsion, the method further comprising:
at the controller:
receiving a variable comprising at least one of an engine variable, a transmission variable, a motor variable, and a battery variable of the vehicle; and
determining whether to operate the vehicle system to provide regenerative braking or propulsion based at least in part on the variable.

17. The method of claim 1 wherein determining the effective motor power comprises determining the motor torque based at least in part upon a current of the motor, a battery bus voltage, an average efficiency of the motor, and the motor speed.

18. The method of claim 1 wherein the determining and causing operations are performed independently of operation of a friction brake of the vehicle.

19. The method of claim 1 wherein causing the motor to apply the torque to the wheel comprises causing a plurality of motors to apply torque to a plurality of wheels.

20. An electronic control unit for a vehicle system of a vehicle, the electronic control unit comprising:
communication circuitry configured to communicate with a battery and a motor of the vehicle system;
a processor operatively connected to the communication circuitry, the processor configured to:
determine an effective motor power for regenerative braking or propulsion of the vehicle at a motor speed and a motor torque based at least in part on a calculated motor power corresponding to the motor speed and motor torque and an electrical power loss of the motor corresponding to the motor speed and the motor torque; and
cause the motor to apply the motor torque to a wheel of the vehicle upon the effective motor power satisfying a vehicle operating condition.

21. The electronic control unit of claim 20 wherein to determine the effective motor power comprises:
determining the calculated motor power based at least in part upon the motor speed and the motor torque; and
determining the electrical power loss of the motor based at least in part upon a data structure including information representative of electrical power loss of the motor at a plurality of motor speeds and a plurality of motor torques.

22. The electronic control unit of claim 20 wherein the motor is operable to provide a plurality of torque values at the motor speed, the torque values including a maximum efficiency torque wherein the motor operates at maximum efficiency for the motor speed; and wherein to cause the motor to apply the motor torque comprises causing the motor to apply a torque that is different than the maximum efficiency torque.

23. The electronic control unit of claim 20 wherein the processor is configured to effect the motor charging the battery for regenerative braking of the vehicle; and
wherein to determine the effective motor power comprises subtracting the electrical power loss of the motor from the calculated motor power.

24. The electronic control unit of claim 20 wherein the processor is configured to effect the motor charging the battery for propulsion of the vehicle; and
wherein the vehicle operating condition comprises the calculated motor power being greater than the electrical power loss of the motor.

25. The electronic control unit of claim 20 wherein the processor is configured to effect the motor charging the battery for regenerative braking of the vehicle; and
wherein the vehicle operating condition comprises maximizing the effective motor power at the motor speed.

26. The electronic control unit of claim 20 wherein the controller is configured to effect the motor rotating the wheel for propulsion of the vehicle; and
wherein to determine the effective motor power comprises adding the electrical power loss of the motor and the calculated motor power.

27. The electronic control unit of claim 20 wherein the controller is configured to effect the motor rotating the wheel for propulsion of the vehicle; and
wherein the vehicle operating condition comprises minimizing the effective motor power.

28. The electronic control unit of claim 20 wherein the communication circuitry is configured to receive a variable indicative of operation of the vehicle;
wherein the processor is configured to determine an adjusted torque based at least on the motor torque and the variable; and
wherein to cause the motor to apply the motor torque comprises causing the motor to apply the adjusted torque.

29. The electronic control unit of claim 28 wherein the variable is indicative of at least one of:
operation of a friction brake of the vehicle;
status of a transmission of the vehicle;
vehicle orientation;
vehicle speed;
temperature of the motor;
battery status; and
battery bus voltage.

30. The electronic control unit of claim 20 wherein the processor is configured to determine the effective motor power, the calculated motor power, and the electrical power loss based at least in part on the motor speed, motor torque, and a battery bus voltage.

31. The electronic control unit of claim 20 in combination with the motor, the motor including a stator configured to be fixed relative to a spindle of the vehicle and a rotor configured to be connected to the wheel; and
wherein to cause the motor to apply the motor torque to the wheel comprises the rotor of the stator applying a torque to the wheel.

32. An electronic control unit for a vehicle system of a vehicle, the electronic control unit comprising:
communication circuitry configured to communicate with a battery and a motor of the vehicle;
a processor operatively connected to the communication circuitry, the processor configured to:
determine an effective motor power at a motor speed and a motor torque based at least in part on a calculated motor power and an electrical power loss of the motor corresponding to the motor speed and the motor torque; and
cause the motor to apply the motor torque to a wheel of the vehicle upon the effective motor power satisfying a vehicle operating condition;
wherein to determine the effective motor power at the motor speed and motor torque comprises:
determining a first effective motor power at the motor speed and a first motor torque based at least in part on a first calculated motor power and a first electrical power loss corresponding to the motor speed and the first motor torque;
determining a second effective motor power at the motor speed and a second motor torque based at least in part on a second calculated motor power and a second electrical power loss corresponding to the motor speed and the second motor torque; and
wherein to cause the motor to apply the motor torque to the wheel comprises:
causing the motor to apply the first motor torque to the wheel upon the first effective motor power satisfying the vehicle operating condition; and
causing the motor to apply the second motor torque to the wheel upon the second effective motor power satisfying the vehicle operating condition.

33. The electronic control unit of claim 32 wherein the first motor torque is greater than the second motor torque;
wherein the second effective motor power is greater than the first effective motor power; and
wherein the second effective motor power satisfies the operating condition.

34. The electronic control unit of claim 20 wherein to determine the effective motor power at the motor speed and the motor torque comprises:
determining a first effective motor power at a first motor speed and a first motor torque and determining a second effective motor power at a second motor speed and a second motor torque; and
wherein to cause the motor to apply the motor torque to the wheel of the vehicle comprises:
causing the motor to apply the first motor torque associated with the first effective motor power upon the motor operating at the first motor speed; and
causing the motor to apply the second torque associated with the second effective motor power upon the motor operating at the second motor speed.

35. The electronic control unit of claim 20 wherein the processor is configured to effect regenerative braking and vehicle propulsion via the motor and battery; and
the communication circuitry is configured to receive a variable comprising at least one of an engine variable, transmission variable, motor variable, and a battery variable of the vehicle; and
the processor configured to determine whether to effect regenerative braking or vehicle propulsion based at least in part upon the variable.

36. The electronic control unit of claim 20 wherein to determine the effective motor power comprises determining the motor torque based at least in part upon a current of the motor, a battery bus voltage associated with the battery, an average efficiency of the motor, and the motor speed.

37. The electronic control unit of claim 20 wherein the processor is configured to determine the effective motor power and cause the motor to apply the motor torque to the wheel independently of operation of a friction brake of the vehicle.

38. A wheel end system for a vehicle, the wheel end system comprising:
   a wheel hub configured to rotatably mount to a spindle of a vehicle;
   a motor having a stator configured to be fixed relative to the spindle and a rotor rotatable relative to the stator, the rotor configured to be secured to the wheel hub;
   a battery connected to the motor; and
   a controller operatively connected to the motor and the battery, the controller configured to:
      determine an effective motor power for regenerative braking or propulsion of the vehicle at a motor speed and a motor torque based at least in part on a calculated motor power corresponding to the motor speed and the motor torque and an electrical power loss of the motor corresponding to the motor speed and the motor torque; and
      cause the motor to apply the motor torque to the wheel hub via the rotor upon the effective motor power satisfying a vehicle operating condition.

39. The wheel end system of claim 38 wherein the motor is operable at a plurality of torque values at the motor speed, the torque values including a maximum efficiency torque value wherein the motor operates at a maximum efficiency for the motor speed; and
   wherein to cause the motor to apply the torque to the wheel hub comprises causing the motor to apply a torque that is different than the maximum efficiency torque.

40. The wheel end system of claim 38 wherein the controller has a regenerative braking mode wherein the controller effects the motor charging the battery;
   wherein, with the controller in the regenerative braking mode, to determine the effective motor power comprises subtracting the electrical power loss of the motor from the calculated motor power.

41. The wheel end system of claim 38 wherein the controller has a regenerative braking mode wherein the controller effects the motor charging the battery;
   wherein, with the controller in the regenerative braking mode, the vehicle operating condition comprises the calculated motor power being greater than the electrical power loss of the motor.

42. The wheel end system of claim 38 wherein the controller has a vehicle propulsion mode; and
   wherein, with the controller in the vehicle propulsion mode, the vehicle operating condition comprises minimizing the effective motor power.

43. The wheel end system of claim 38 wherein the controller is configured to receive a variable indicative of operation of the vehicle, the variable indicative of at least one of:
   operation of a friction brake;
   status of a transmission of the vehicle;
   vehicle orientation;
   vehicle speed;
   temperature of the motor;
   battery status; and
   battery bus voltage;
   wherein the controller is configured to determine an adjusted torque based at least on the motor torque and the variable; and
   wherein to cause the motor to apply the torque comprises causing the motor to apply the adjusted torque.

44. A wheel end system for a vehicle, the wheel end system comprising:
   a wheel hub configured to rotatably mount to a spindle of a vehicle;
   a motor having a stator configured to be fixed relative to the spindle and a rotor rotatable relative to the stator, the rotor configured to be secured to the wheel hub;
   a battery connected to the motor;
   a controller operatively connected to the motor and the battery, the controller configured to:
      determine an effective motor power at a motor speed and a motor torque based at least in part on a calculated motor power and an electrical power loss of the motor corresponding to the motor speed and the motor torque; and
      cause the motor to apply the motor torque to the wheel hub via the rotor upon the effective motor power satisfying a vehicle operating condition;
   wherein to determine the effective motor power at the motor speed and motor torque comprises:
      determining a first effective motor power at the motor speed and a first motor torque based at least in part on a first calculated motor power and a first electrical power loss corresponding to the motor speed and the first motor torque;
      determining a second effective motor power at the motor speed and a second motor torque based at least in part on a second calculated motor power and a second electrical power loss corresponding to the motor speed and the second motor torque;
   wherein to cause the motor to apply the motor torque to the wheel comprises:
      causing the motor to apply the first motor torque to the wheel upon the first effective motor power satisfying the vehicle operating condition; and
      causing the motor to apply the second motor torque to the wheel upon the second effective motor power satisfying the vehicle operating condition.

45. The wheel end system of claim 44 wherein the first torque is greater than the second torque;
   wherein the second effective motor power is greater than the first effective motor power; and
   wherein the second effective motor power satisfies the vehicle operating condition.

* * * * *